United States Patent
Rauhala et al.

(10) Patent No.: US 11,754,660 B2
(45) Date of Patent: Sep. 12, 2023

(54) OFFLINE RADIO MAPS FOR CROWDSOURCED GNSS RESCUE AREAS

(71) Applicant: HERE GLOBAL B.V., Eindhoven (NL)

(72) Inventors: Petri Rauhala, Tampere (FI); Lauri Aarne Johannes Wirola, Tampere (FI); Marko Luomi, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 17/541,723

(22) Filed: Dec. 3, 2021

(65) Prior Publication Data
US 2023/0176166 A1 Jun. 8, 2023

(51) Int. Cl.
| | |
|---|---|
| *G01S 19/48* | (2010.01) |
| *G01S 5/00* | (2006.01) |
| *G01S 5/02* | (2010.01) |
| *G01S 19/17* | (2010.01) |

(52) U.S. Cl.
CPC ............... *G01S 5/013* (2020.05); *G01S 5/011* (2020.05); *G01S 5/012* (2020.05); *G01S 5/02521* (2020.05); *G01S 5/02523* (2020.05); *G01S 5/02526* (2020.05); *G01S 19/17* (2013.01)

(58) Field of Classification Search
CPC ...... G01S 19/17; G01S 19/42; G01S 5/02526; G01S 5/02523; G01S 5/02521; G01S 5/01; G01S 5/011; G01S 5/012; G01S 5/013
USPC .......................... 342/357.55, 357.25, 357.31
See application file for complete search history.

(56) References Cited

U.S. PATENT DOCUMENTS

| | | | |
|---|---|---|---|
| 8,305,264 B1 | 11/2012 | Jones et al. | |
| 8,977,287 B1* | 3/2015 | Gold | H04W 64/00 |
| | | | 702/180 |
| 8,977,298 B2 | 3/2015 | Marti et al. | |
| 9,313,614 B2 | 4/2016 | Alsehly et al. | |
| 9,715,002 B2* | 7/2017 | Wirola | H04W 64/003 |
| 9,939,515 B2* | 4/2018 | Wirola | H04W 4/024 |
| 10,267,894 B2* | 4/2019 | Wirola | H04W 24/10 |
| 10,698,118 B1 | 6/2020 | Varoglu | |
| 11,592,517 B2* | 2/2023 | Wirola | G01S 5/02524 |

(Continued)

OTHER PUBLICATIONS

U.S. Appl. No. 17/128,037, filed Dec. 19, 2020, Entitled: Offline Radio Maps for GNSS-Denied Areas, Inventors: Lauri Wirola, Petri Rauhala, Marko Luomi.

*Primary Examiner* — Chuong P Nguyen
(74) *Attorney, Agent, or Firm* — Jeffrey R. Moisan; HERE GLOBAL B.V.

(57) ABSTRACT

In accordance with the disclosed approach, positioning server(s) could receive, from mobile devices, information indicating a plurality of GNSS rescue areas, each respective GNSS rescue area of the plurality of GNSS rescue areas corresponding to a respective geographic area visited by a respective one of the mobile devices in which (i) at least one GNSS-based position estimate is or was unavailable and (ii) the respective mobile device had demand for positioning data of at least a particular quality level. Given this, the server(s) could generate a GNSS rescue map representing radio data for the plurality of GNSS rescue areas. In this way, the server(s) could transmit, to a mobile device, an offline radio map representing a subset of the GNSS rescue map, to provide radio data for at least one of the GNSS rescue areas or portion thereof.

20 Claims, 10 Drawing Sheets

(56) References Cited

U.S. PATENT DOCUMENTS

| | | |
|---|---|---|
| 2009/0189810 A1 | 7/2009 | Murray |
| 2011/0307171 A1 | 12/2011 | Waite |
| 2019/0113632 A1 | 4/2019 | Lucrecio et al. |
| 2020/0169846 A1* | 5/2020 | Ivanov .................... H04W 4/80 |
| 2020/0304952 A1* | 9/2020 | Berkovich .......... G01S 5/02522 |
| 2021/0011113 A1* | 1/2021 | Viitala ................. H04B 17/391 |
| 2022/0196784 A1* | 6/2022 | Wirola ................ G01S 5/02524 |

* cited by examiner

500

602 — TRANSMIT, BY A FIRST MOBILE DEVICE TO AT LEAST ONE POSITIONING SERVER, ONE OR MORE OF (I) INFORMATION INDICATING AN APPROXIMATE LOCATION OF THE FIRST MOBILE DEVICE OR (II) A REQUEST FOR AN OFFLINE RADIO MAP, THE REQUEST INCLUDING THE APPROXIMATE LOCATION OF THE FIRST MOBILE DEVICE,
WHERE THE AT LEAST ONE POSITIONING SERVER HAS ACCESS TO A GNSS RESCUE MAP THAT REPRESENTS RADIO DATA FOR A PLURALITY OF GNSS RESCUE AREAS AND IS GENERATED BASED ON CROWDSOURCED DATA FROM A PLURALITY OF MOBILE DEVICES, AND
WHERE EACH RESPECTIVE GNSS RESCUE AREA OF THE PLURALITY OF GNSS RESCUE AREAS CORRESPONDS TO A RESPECTIVE GEOGRAPHIC AREA VISITED BY A RESPECTIVE ONE OF THE PLURALITY OF MOBILE DEVICES IN WHICH (I) AT LEAST ONE GNSS-BASED POSITION ESTIMATE IS OR WAS UNAVAILABLE AND (II) THE RESPECTIVE MOBILE DEVICE HAD DEMAND FOR POSITIONING DATA OF AT LEAST A PARTICULAR QUALITY LEVEL

604 — IN RESPONSE TO THE TRANSMITTING, RECEIVE, BY THE FIRST MOBILE DEVICE FROM THE AT LEAST ONE POSITIONING SERVER, AN OFFLINE RADIO MAP REPRESENTING A SUBSET OF THE GNSS RESCUE MAP, TO OBTAIN RADIO DATA FOR AT LEAST ONE OF THE PLURALITY OF GNSS RESCUE AREAS OR PORTION THEREOF IN ACCORDANCE WITH THE SUBSET

FIGURE 6

OFFLINE RADIO MAPS FOR CROWDSOURCED GNSS RESCUE AREAS

FIELD OF DISCLOSURE

Embodiments of the present disclosure relate to the field of positioning technologies, and more specifically to methods and systems for generation, download, and/or use of an offline (partial) radio map to enable Global Navigation Satellite System (GNSS) service augmentation.

BACKGROUND

In practice, positioning technologies could provide for numerous benefits, such as by enabling tracking of assets and/or navigation through indoor and outdoor environments, among other possibilities. Such benefits may be realized through the development of positioning systems) and associated service(s) that may collectively provide a solution to various positioning-related use cases. Generally speaking, a positioning solution can be commercially successful if it is globally scalable, has low deployment and maintenance costs, and offers an acceptable end-user experience. To facilitate this, the solution could be based on existing infrastructure deployed in buildings and/or outdoors (e.g., Wi-Fi, Bluetooth, Base Station(s) etc.) as well as on existing capabilities in consumer devices, such as on radio technologies that are already supported in numerous consumer devices on the market, among other options.

One approach for such radio-based positioning could involve crowdsourced collection of radio "fingerprint(s)" from mobile devices, which may then be used for generating or updating radio map(s). A given fingerprint may include radio data representing measurements of radio signals respectively observed by the mobile devices, which may include received signal strength value(s), round-trip time value(s) and/or respective identifiers of radio node(s) emitting those signals) etc. Additionally, a given fingerprint may include a position estimate determined or obtained by the mobile device, which may be used for geo-referencing the radio data in the fingerprint so as to indicate a location where the radio data was collected. Such a position estimate may be, for example, based on Global Navigation Satellite System (GLASS) data, sensor data, and/or may be manually inputted via a user interface, among other options.

Once a radio map is generated or updated based on collected fingerprint(s), the radio map may effectively model a radio environment in an indoor and/or outdoor area. In practice, this could enable an entity (e.g., a server or a mobile device) to determine characteristics of radio signals that are expected to be observable respectively at different locations in the area. Given this, the entity could compare further (e.g., radio) measurements from a device to the radio map, to estimate a position of that device in the area.

In this regard, radio-based positioning can be facilitated in accordance with various modes of operation, such as an online mode and an offline mode.

In the online mode, a mobile device could perform radio measurements and then provide radio data to a positioning server in accordance with these measurements. The positioning server could have a radio map (e.g., a global radio map) stored thereon or otherwise accessible, and the positioning server could then use the received radio data and the radio map to determine and provide a position estimate to the mobile device. In this way, the mobile device could obtain a position estimate e.g., via a positioning application programming interface (API) without the need to store a radio map, as long as the mobile device has data connectivity.

In the offline mode, however, a mobile device may store a local copy of a partial radio map (e.g., a subset of the global radio map), which could also be referred to as an offline radio map, downloaded or downloadable radio map, or the like. The mobile device could download this local copy from the positioning server, or the local copy could be installed or loaded onto the device in any feasible manner. In either case, the mobile device could perform radio measurements in an area and then use those measurements in combination with e partial radio map for the area so as to estimate the position of the mobile device in that area.

Overall, the offline mode of radio-based positioning may have various advantages, including for the mobile device or its user as well as for the provider of the positioning service. For example, in the offline mode, a mobile device can effectively position itself in a given area even without data connectivity as long as the mobile device has a local copy of a partial radio map for that given area, thereby increasing "location awareness" of the mobile device whether or not data connectivity is possible or reliable. And because mobile devices can effectively position themselves in the offline mode without contacting a positioning server each time, the offline mode can also help reduce use of computational and energy resources by positioning server(s), even when online positioning is available. Moreover, because a mobile device does not need to contact a positioning server in the offline mode, there is no need for the mobile device to wait to receive a position estimate from the positioning server, which in turn reduces the time for obtaining a position estimate (i.e., a faster "time-tip-first-fix"). Other examples are also possible.

Although the offline positioning mode has numerous benefits, this offline mode also has some drawbacks. For example, in a standard arrangement for downloading or otherwise obtaining a partial radio map for storage, a mobile device is typically configured to request tiles of the global radio map corresponding to e.g., a pre-defined (e.g., 1-kilometer) radius around the device's current location, thereby causing a positioning server to provide a partial radio map corresponding to an area associated with that pre-defined radius. Unfortunately, however, the data size of the partial radio map may end up being relatively large, which could lead to excessive consumption of computational and other resources.

One approach for addressing this data size issue could involve applying algorithms to exclude some radio nodes (i.e., represented in the global radio map) from being represented in the partial radio map, the excluded radio nodes being deemed as non-relevant for inclusion according to one or more factors and specifically being in areas of high radio node density in the global radio map. Yet, although this approach could help reduce the data size while enabling offline positioning in those areas, this approach still may not sufficiently reduce the data size of partial radio maps.

In particular, as communication networks keep expanding (e.g., due to 5G deployment or the like), the number of serving radio nodes grows rapidly, which may further increase the size of the global radio map over time. And as the size of the global radio map increases, the size of partial radio maps obtainable by mobile devices may also increase under the above-described standard arrangement. In turn, this may increase consumption of valuable communication bandwidth, energy resources at the device and/or server(s), and/or the device's storage space etc.

Therefore, at issue then is how to further reduce or otherwise optimize the respective sizes of offline radio maps while ensuring that mobile devices can still benefit from the offline mode as described and use it to obtain reliable position estimations, and so on. Accordingly, a technical improvement is desired and would advantageously improve performance of radio-based positioning systems, among other beneficial outcomes.

SUMMARY

Disclosed herein are improved approaches for optimizing partial radio map(s) that can be used by mobile device(s) for purposes of offline radio-based positioning. The present disclosure stems from a unique recognition that a mobile device could determine its position using GNSS in certain area(s) and using offline radio-based positioning in other area(s), such as in area(s) where GNSS-based position estimates are not obtainable or reliable but where high-quality positioning (e.g., GNSS-like positioning quality) is still deemed valuable or otherwise necessary.

Specifically, assuming that a mobile device has communication radio(s) and a GNSS receiver, the mobile device can likely determine its position using GNSS in "open sky" conditions and might need offline radio map(s) only for area(s) where GNSS is unavailable so as to determine its position "offline" in those area(s). Such area(s) where GNSS is temporarily or permanently unavailable could include e.g., indoor area(s), urban canyon(s), area(s) where flawed (e.g., distorted) or no GNSS signal(s) arrive due to technical satellite issues, and/or area(s) where GNSS "spoofing" or "jamming" device(s) disturb GNSS signal(s), among other possibilities.

Given this, if a mobile device obtains an offline radio map according to the above-described standard arrangement, that offline radio map may unnecessarily include radio data for area(s) in which GNSS positioning works for the mobile device as well. And including radio data for such area(s) in the offline radio map may needlessly increase the size of the offline radio map, which could ultimately still lead to excessive consumption of valuable bandwidth, energy, storage space, and/or other resources as described.

Moreover, even if an offline radio map explicitly excludes area(s) where GNSS positioning works, the present disclosure recognizes that such an offline radio map may still represent some "excess" area(s) where offline positioning is less likely to be used, which may also needlessly increase size of the offline radio map. By way of example, there may be "excess" area(s) where mobile device(s) never or rarely have demand for positioning data (e.g., a position estimate) of a high-quality level (e.g., substantially close to GNSS quality level). So, a user of a mobile device could still be offered acceptable experience with a positioning solution even if the user's mobile device does not obtain offline radio data for such "excess" area(s).

Hence, to help overcome the above-described issues, the disclosed approaches may provide for better control as to which area(s) to represent in an offline radio map that can be generated from an initial (e.g., global) radio map accessible to positioning server(s) or the like.

According to the present disclosure, a mobile device could be configured to identify area(s) the mobile device has or is visiting where GNSS does not work and where a use case (e.g., application) of the mobile device needed substantially high-quality positioning information, such as a positioning estimate of a quality level (e.g., accuracy level) that is at or close to quality provided by GNSS. Such identified area(s) may be specific to the needs of the mobile device at issue and thus could referred to herein as "device-specific GNSS rescue area(s)."

Once the mobile device identifies the device-specific GNSS rescue area(s), the mobile device could obtain a corresponding partial radio map from positioning server(s). Namely, the mobile device could obtain a partial radio map that represents radio data only for the identified device-specific GNSS rescue area(s). And, in some implementations, the mobile device could more specifically obtain a partial radio map for device-specific GNSS rescue areas which meet additional criteria, such as repetitive or frequent enough visits by the mobile device, or frequent enough need by the mobile device for (e.g., close to) GNSS quality location information, among other options. In any case, the mobile device could then use that partial radio map for "offline" radio-based position estimate(s) in one or more of the device-specific GNSS rescue area(s), as necessary. Consequently, the obtained partial radio map can optimally supplement or otherwise augment the mobile device's GNSS-based positioning in other areas so as to result in a seamless, consistent, and reliable overall positioning solution for the mobile device.

Furthermore, positioning server(s) (e.g., the "cloud") can obtain information about GNSS rescue area(s) from various mobile devices so as to compose a 'global' GNSS rescue map. For example, mobile device(s) could learn and improve their respective device-specific GNSS rescue area(s), and each such mobile device could respectively send information about its respective device-specific GNSS rescue area(s) to the positioning server(s). A given mobile device could do so periodically and/or upon request from the positioning server(s) (e.g., as part of a crowdsourcing process). In turn, positioning server(s) can combine such information and over time compose a global GNSS rescue map representative of GNSS rescue areas.

Generally, such a global GNSS rescue map can be leveraged by a mobile device in need of high-quality positioning, which could be one of the above-referenced mobile devices that contributed to the crowdsourcing process for generating the global rescue map or could be any other mobile device. For example, when a mobile device determines that high-quality positioning is required for a use case of that mobile device particularly in an instance where GNSS-based positioning is not obtainable or reliable, the mobile device could responsively send a query, to the positioning server(s), indicating its approximate location. In turn, the positioning server(s) could use the approximate location combination with the global GNSS rescue map to determine whether the mobile device at issue is in a GNSS rescue area. If the mobile device is in a GNSS rescue area, the positioning server(s) (i) could provide a suggestion to the mobile device as to whether the mobile device should obtain offline radio map data for the GNSS rescue area or portion thereof, (ii) could automatically provide such offline radio map data to the mobile device, and/or (iii) could provide information about the GNSS rescue area to the mobile de-vice so as to enable the mobile device to determine whether it is optimal to obtain such offline radiomap data. These and various other implementations are further contemplated herein.

Advantageously, embodiments of the present disclosure may help reduce the size of offline radio map(s) obtained by mobile device(s) while ensuring that those offline radio map(s) have optimized data to enable offline positioning in area(s) where such offline positioning capabilities would be beneficial, such as in area(s) where GNSS is not working or reliable but where high-quality positioning is deemed necessary or otherwise beneficial. Moreover, by helping to reduce the size of offline radio map(s), the disclosed techniques can in turn provide a technical solution to help eliminate or reduce excessive consumption of network, energy; storage, and/or other resources. For example, from the perspective of the positioning service provider, the disclosed techniques may help decrease the 'cost-to-serve', because less data is transferred from the 'cloud' to the mobile device(s), i.e., out-bound data transfer costs decrease. Other advantages are also possible without departing from the scope of the present disclosure.

Accordingly, in one aspect, disclosed is a method for obtaining radio data that enables offline device positioning and is optimized according to a usage pattern of a mobile device. The method involves: identifying, by the mobile device, one or more device-specific GNSS rescue areas, where the one or more device-specific GNSS rescue areas correspond to one or more geographic areas visited by the mobile device in which (i) at least one GNSS-based position estimate is or was unavailable and (ii) the mobile device had demand for positioning data of at least a particular quality level; receiving; by the mobile device from at least one positioning server, an offline radio map representing radio data only for the one or more device-specific GNSS rescue areas; storing, by the mobile device, the offline radio map in a local data storage device; and performing, by the mobile device, one or more position estimations using the offline radio map representing radio data only for the one or more device-specific GNSS rescue areas.

In another aspect, disclosed is a method for providing radio data that enables offline device positioning and is optimized according to a usage pattern of a mobile device. The method involves: receiving, by one or more processors, information indicating one or more device-specific GNSS rescue areas identified by the mobile device, where the one or more device-specific GNSS rescue areas correspond to one or more geographic areas visited by the mobile device in which (i) at least one GNSS-based position estimate is or was unavailable and (ii) the mobile device had demand for positioning data of at least a particular quality level; generating, by the one or more processors, an offline radio map representing radio data only for the one or more device-specific GNSS rescue areas; and transmitting, by the one or more processors, the offline radio map to the mobile device for storage at the mobile device.

In yet another aspect, disclosed is a method that involves: receiving, by at least one positioning server from a plurality of mobile devices, information indicating a plurality of GNSS rescue areas, where each respective GNSS rescue area of the plurality of GNSS rescue areas corresponds to a respective geographic area visited by a respective one of the plurality of mobile devices in which (i) at least one GNSS-based position estimate is or was unavailable and (ii) the respective mobile device had demand for positioning data of at least a particular quality level; generating, by the at least one positioning server, a GNSS rescue map representing radio data for the plurality of GNSS rescue areas; and transmitting, by the at least one positioning server to a first mobile device, an offline radio map representing a subset of the GNSS rescue map, to provide radio data for at least one of the plurality of GNSS rescue areas or portion thereof in accordance with the subset.

In yet another aspect, disclosed is a method that involves: transmitting, by a first mobile device to at least one positioning server, one or more of (i) information indicating an approximate location of the first mobile device or (ii) a request for an offline radio map, the request including the approximate location of the first mobile device, where the at least one positioning server has access to a GNSS rescue map that represents radio data for a plurality of GNSS rescue areas and is generated based on crowdsourced data from a plurality of mobile devices, and where each respective GNSS rescue area of the plurality of GNSS rescue areas corresponds to a respective geographic area visited by a respective one of the plurality of mobile devices in which (i) at least one GNSS-based position estimate is or was unavailable and (ii) the respective mobile device had demand for positioning data of at least a particular quality level; and in response to the transmitting, receiving, by the first mobile device from the at least one positioning server, an offline radio map representing a subset of the GNSS rescue map, to obtain radio data for at least one of the plurality of GNSS rescue areas or portion thereof in accordance with the subset.

In yet another aspect, disclosed is an apparatus including one or more processors, a non-transitory computer readable medium, and program instructions stored on the non-transitory computer readable medium. The program instructions may be executable by the one or more processors to perform any operations described herein, such as any of those set forth in the disclosed method(s), among others.

In yet another aspect, disclosed is a non-transitory computer readable medium having stored thereon instructions executable by processor(s) to cause an apparatus to perform operations described herein, such as any of those set forth in the disclosed method(s), among others.

In yet another aspect, disclosed is a computer program product including instructions which, when the program is executed by a computer, cause the computer to carry out the steps described herein, such as any of those set forth in the disclosed method(s) In other words, the computer program product may have computer-executable program code portions stored therein, the computer-executable program code portions including program code instructions configured to perform any operations set forth in any of the method(s) disclosed herein, among others.

These as well as other features and advantages of the invention will become apparent from the following detailed description considered in conjunction with the accompanying drawings where appropriate. It should be understood, however, that the drawings are designed solely for purposes of illustration and not as a definition of the limits of the present disclosure. It should be further understood that the drawings are not drawn to scale and that they are merely intended to conceptually illustrate one or more of the features described herein.

BRIEF DESCRIPTION OF THE DRAWINGS

FIG. 6 is an example flowchart related to providing an offline radio map based on crowdsourced data from mobile devices, in accordance with an example implementation.

DETAILED DESCRIPTION

Figure 1:
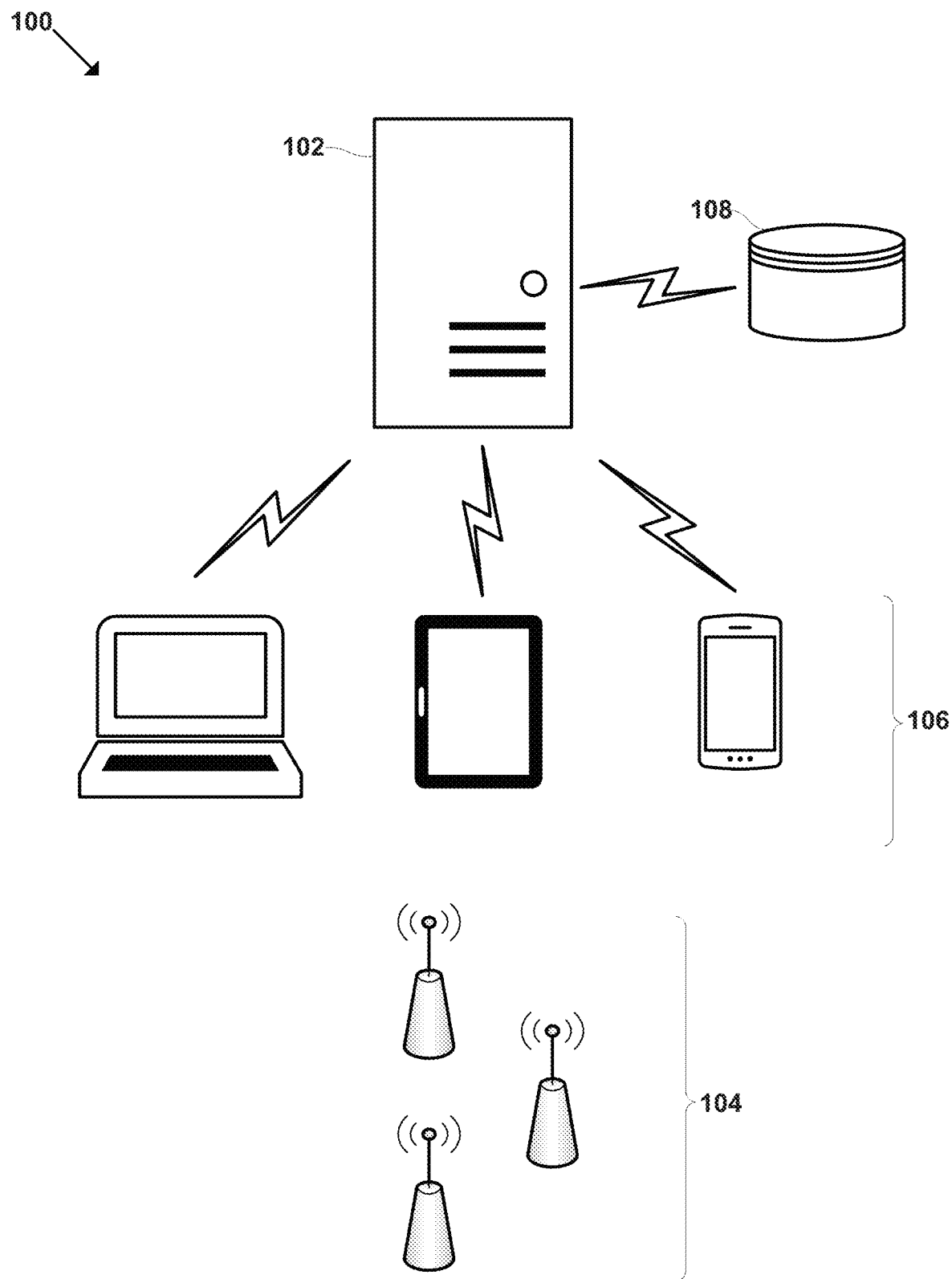
FIG. 1 illustrates an arrangement that may enable a positioning solution, in accordance with an example implementation.

Some embodiments of the present disclosure will now be described in more detail with reference to the accompanying drawings, in which some, but not all, embodiments of the present disclosure are shown. Indeed, various aspects of the present disclosure may be embodied in different forms and should not be construed as limited to the embodiments set forth herein.

I. Example System(s) for Indoor and/or Outdoor Positioning

Positioning methods that are seamless and available at all times might rely upon novel systems and solutions that are specifically developed and, if necessary, deployed for this purpose. Traditional positioning technologies, which are mainly used outdoors (e.g., satellite positioning technologies), cannot always deliver the desired performance that would enable a seamless navigation experience at all times, particularly indoors. For instance, in the case of indoor positioning, satellite-based radio navigation signals simply do not penetrate through the walls and roofs sufficiently for adequate signal reception and cellular signals often have a bandwidth that is too narrow for accurate ranging by default. And in the case of outdoor scenarios, there may be situations where e.g., satellite-based radio navigation provides for insufficient coverage, such as in the event of bad weather or in urban street canyons.

Several dedicated solutions have already been developed and commercially deployed during past years, such as solutions based on technologies like pseudolites (GPS-like short-range beacons), ultra-sound positioning, Bluetooth or Bluetooth LE signals, and wireless local area network (WLAN) and/or other network fingerprinting. What is typical to these solutions is that they tend to involve either deployment of totally new infrastructure (such as beacons or tags) and/or manual exhaustive radio-surveying of streets and buildings, including all the floors, spaces and rooms. Using such solutions may be rather expensive and will likely take a considerable amount of time to build the coverage to the commercially expected level. Also, the diversity of these technologies makes it difficult to build a globally scalable indoor positioning solution, and integration and testing will become complex if a large number of technologies needs to be supported in consumer devices.

A commercially successful positioning solution would likely be globally scalable, have low maintenance and deployment costs, and offer acceptable end-user experience. To facilitate this, the positioning solution can be based on existing infrastructure and on existing capabilities in the consumer devices. For example, the positioning solution could be based on e.g., Cellular network infrastructure, Wi-Fi and/or Bluetooth, which are technologies already supported in numerous devices, such as smartphones, tablets, laptops and even in the majority of the feature phones. Thus, it is advantageous to develop a positioning solution that uses cellular and/or non-cellular radio signals in a way that (i) makes it possible to achieve desired horizontal and vertical positioning accuracy and (ii) provides the ability to quickly build global coverage.

FIG. 1 illustrates an arrangement 100 that may enable a positioning solution, in accordance with example implementations. Arrangement 100 could include a server system 102 (could also be referred to as server(s) or the like), radio devices 104 (could also be referred to as radio nodes or the like), one or more mobile devices such as mobile devices 106, and a database 108. The server system 102, radio devices 104, mobile device(s) 106, and/or database 108 may be configured to communicate with one another via one or more communication links (e.g., via a cellular and/or a non-cellular communication network).

As an initial matter, a mobile device could be any electronic device that is movable from one position to another. For example, the mobile device(s) 106 could be or otherwise include cellular phone(s), personal digital assistant(s), a laptop computer(s), tablet computer(s), and/or wearable device(s), among other options. In some cases, a mobile device could also be referred to as a handheld device or a user device, among other possibilities.

Further, radio devices 104 may include any type of device that is configured to emit (and optionally receive) radio signals. For example, the radio devices 104 could include wireless WLAN access point(s), such as a WLAN access point that supports or is otherwise configured according to the IEEE 802.11 standard (e.g., a Wi-Fi access point). Additionally or alternatively, the radio devices 104 could include Bluetooth beacon(s) and/or cellular network node(s) (e.g. Global System for Mobile Communications (GSM), Universal Mobile Telecommunications System (UNITS), Long Term Evolution (LTE), and/or 5G base station(s)), among other options.

Furthermore, server system 102 could take various forms without departing from the scope of the present disclosure. By way of example, server system 102 could include a single server or a plurality of servers (e.g., forming a server cloud). Moreover, server system 102 could be embodied as a positioning server of a positioning system, such as of a non-GNSS based radio positioning system for indoor and/or outdoor positioning.

In practice; a non-GNSS based radio positioning system could include or otherwise rely on radio devices (e.g., radio devices 104) to support the positioning solution described herein. Such radio devices may include dedicated radio devices (e.g, Bluetooth beacons) that are installed in the environment for which the positioning solution is provided. Additionally or alternatively, the non-GNSS based radio positioning system could make use of existing radio devices, such as WLAN access points and/or cellular network nodes. In any case, the radio devices could be deployed in particular area(s), which may be indoors and/or outdoors.

Given this arrangement 100, the server system 102 could generate and/or update a radio map for an area, which may in turn enable position estimations for mobile device(s) in the area. Namely, the radio map could enable an entity (e.g., a server system or a mobile device) to determine characteristics of radio signals (e.g., transmitted by radio devices) that are expected to be observable respectively at different locations in the area. Accordingly, the term radio map may refer to any collection of data that provides location-linked information on a radio environment.

To help facilitate generation or updating of a radio map, server system 102 could collect "fingerprint(s)" from mobile device(s). A fingerprint collected from a given mobile device may contain or otherwise represent measurement(s) by the mobile device and a position estimate (for geo-referencing e.g., radio data collected by the mobile device). The position estimate may be, for example, based on GNSS data, sensor data, and/or previously collected radio measurements, or may be manually inputted via a user interface. And the measurements may include, for example, radio signal parameter(s) of observed radio signals measured by a mobile device and/or identifiers of radio device(s) that emitted the observable radio signals, among others. In more specific examples, collected fingerprint(s) may respectively contain any feasible combination of the following types of measurements: global and/or local identifier(s) of cellular nets network node(s), Wi-Fi access point identifier(s), beacon identifier(s), signal strength measurement(s) (e.g., Received Signal Strength (RSS)), pathloss estimate(s), timing measurement(s) (timing advance or round-trip time), speed data, reference position measurement technology, collection device information, battery level data, and/or environment sensor data etc. Other examples are also possible.

In some implementations, collected fingerprints could enable generating or updating of a radio map for a 3D positioning solution e.g., in multi-level buildings. In particular, features of radio signals (e.g., received signal strength) that may be used for horizontal positioning may vary significantly from one building layer to another in different altitude levels at the same horizontal position, often due to the radio signal attenuation caused by a building's structure. This might affect the eventual performance of a radio-based positioning system. Therefore, it would be particularly beneficial for a radio map to indicate characteristics of radio signals that are expected to be observable respectively at different attitudes/floors of a multi-level building.

Given this, collected fingerprint(s) could additionally or alternatively include data representing or otherwise enabling determination of altitude(s) of mobile device(s). In particular, fingerprint(s) may include altitude data representing absolute and/or relative altitude(s) of a mobile device. Additionally or alternatively, fingerprint(s) may include pressure data representing pressure measurements, and such pressure data can be used to determine altitudes) and/or altitude changes, e.g., according to a predictable relationship between pressure and altitude.

In practice, there may be various approaches for determining or otherwise generating altitude data. In one example, altitude data could be determined according to GNSS-based altitude estimate(s), which may work relatively well outdoors in good signal conditions, but may be unavailable or inaccurate indoors. In another example, altitude data could be determined according to an altitude map representing altitudes respectively at different locations. In yet another example, a barometer (e.g., in a mobile device) may provide altitude/pressure data (e.g., pressure measurements) that can be used to estimate or determine altitude changes of a mobile device. In this regard, reference altitudes, which may be GNSS-based and/or based on an altitude map, could be used in combination with altitude changes determined according to barometer measurements, so as to determine new altitude(s) of a mobile device. Other examples are also possible.

Generally, altitude data in a given fingerprint could represent altitude(s) of a mobile device substantially at the time the mobile device observed or otherwise determined certain (e.g., radio) measurements. For instance, a mobile device could provide, to server system 102, a fingerprint including radio measurement(s) by the mobile device and altitude data representing an altitude of the mobile device substantially during the radio measurement(s). And if the server system 102 has information indicating respective altitude(s) of floor(s) in a building, the altitude data in the fingerprint could be used to determine floor(s) at which the radio measurement(s) were performed. As such, server system 102 could associate certain altitude data with certain radio measurements, so as to generate or update a radio map to accurately represent characteristics of radio signals expected to be observable respectively at different attitudes/floors of an indoor area, which in turn could enable accurate positioning estimations, e.g., in a multi-level building.

Furthermore, because the above-described collection of fingerprint(s) is beneficial, such collection of fingerprint(s) could be part of a crowdsourcing process that occurs continuously or at least from time-to-time. For example, mobile devices of a large number of consumers could continuously transmit fingerprint(s) to the positioning server (e.g., server system 102) collecting the fingerprint(s). Consumers may consent to participation in such a collection process, if their device is equipped with necessary functionality to enable the fingerprint generation and/or collection at issue as a background process, naturally with the end-user consent. Also, it could be possible to use volunteers to actively survey area(s) so as to enable collection of fingerprint(s) for those area(s). Other examples are also possible.

Given that collection of fingerprints) may allow for understanding of how radio signals behave and travel in an area (e.g., a building), the server system 102 could use the collected fingerprint(s) in various ways to generate or update a radio map for the area.

By way of example, the server system 102 could define a grid having a plurality of points at e.g., intersecting lines. The server system 102 may define the grid to cover a site such that each grid point corresponds to a geographical location at the site. If the site (e.g., a building) comprises several floors, a separate grid may be defined for each floor, or a single three-dimensional grid may be defined with one dimension for the different floors.

Given this, if the server system 102 collects a fingerprint from a mobile device (e.g., a report that includes RSS value(s), associated radio device identifier(s), and/or other information as discussed), the server system 102 could map (i) RSS values) and/or associated radio device identifier(s) included in that fingerprint to (ii) the grid point corresponding to a geographical location that is closest to the position estimate indicated in that fingerprint. The server system 102 could perform such a process respectively for some or all fingerprint(s) collected from mobile device(s) in the site, so as to generate a grid-based radio map for the site.

In this example, if there are several RSS values for the same radio device that would be mapped to the same grid point, the server system 102 could determine an average value (e.g., arithmetic mean or median value) of those RSS values and associate the average value with the grid point at issue. On the other hand, for grid points to which no RSS values could be mapped due to missing fingerprint(s) from the corresponding areas at the site, the server system 102 could generate RSS values by interpolating surrounding RSS values if possible, and by extrapolating neighboring RSS values otherwise. In this way, the server system 102 could generate the radio map to identify radio devices and/or RSS values expected to be observed respectively at each of a plurality of locations throughout the site. Other (e.g., non-grid based) radio maps are also possible.

In some implementations, the radio map could include, be combined with, or otherwise correspond to another map or layout image representing features of an indoor and/or outdoor area at various locations in the area e.g., an open area map for a pedestrian walkable area as further described herein). In the context of an indoor area, for instance, such features may include rooms, hallways, entryways (e.g., doors), vertical connectors (e.g., elevators, escalators, and/or stairs), and/or items situated in the indoor area (e.g., furniture), among numerous other possibilities. Given this, the radio map could indicate characteristics of the radio environment respectively at or nearby certain features in the area. Moreover, a mobile device could be configured to display such a radio map, to enable automatic or manual assessment of the radio environment in the area. Such an assessment could help determine whether sufficient extent of fingerprint(s) has been collected in a certain location (e.g., near a certain feature), and may provide other advantages as well.

Once a radio map is generated or updated, the server system 102 could store the radio map in a database 108, so that the server system 102 could refer the radio map or a portion thereof on an as-needed basis and/or so that the server system 102 provide the radio map or portion thereof (e.g., to a mobile device) on an as-needed basis for positioning purposes. Generally, the stored radio map could be associated with an indoor or other space (e.g., a particular building) for which the radio map provides coverage. And the server system 102 and/or a mobile device could select a radio map to be used for positioning purposes that is associated with an indoor (or other) space at which or next to which the mobile device is located. In practice, the server system 102 and/or a mobile device could determine an indoor space at which or next to which the mobile device is located based on GNSS measurement(s) by the mobile device and/or an identifier of an access point to which the mobile device is connected, among other options.

In one case, the server system 102 could use the radio map to estimate a position of a mobile device, such as in response to a request by the mobile device to do so. In particular, the server system 102 could receive, from the mobile device, a measurement report indicating identifiers of radio device(s) and/or RSS values that are observable by the mobile device at the current position of the mobile device, and possibly other radio characteristics observable by the mobile device. In some scenarios, the measurement report could optionally also include other information that might aid in determining a position estimate, such as e.g., barometric/altitude information that may assist in determining a floor level as part of the position estimate. Nevertheless, the server system 102 can compare information in the measurement report to the radio map, to determine a position estimate. For example, the server system 102 could determine that radio device identifier(s) and RSS values) in the measurement report substantially match radio device identifier(s) and RSS value(s) associated with a particular grid point corresponding to a particular geographical location at the site. In turn, the server system 102 could provide, to the mobile device, a position estimate indicative of the particular geographical location at the site.

In another case, the mobile device could use the radio map (or a portion thereof) to estimate its position. To facilitate this, the mobile device could obtain, from the server system 102, at least a portion of the radio map, and could at least temporarily store the radio map locally. Once the mobile device has the radio map locally stored thereon, the mobile device could use the techniques described above in association with the server system 102 so as to estimate its position (e.g., comparing information in a measurement report to the radio map). In this way, the mobile device could engage in "offline" positioning estimations.

Advantageously, the mobile device could engage in "offline" positioning estimations at times when connectivity between the mobile device and the server system 102 is unavailable, when it is desired to reduce a load on the server system 102 (e.g., reduce the extent of processing by the server system 102), when the mobile device seeks to obtain a position estimate relatively, quickly (e.g., a very short time-to-first-fix), or in other situations.

In any case, a position estimate obtained using the above-described positioning solution could be used in various ways. For example, the mobile device could display (e.g., via a display device) an indoor navigation application including, e.g., an open area map of an indoor area and visually indicating a position of the mobile device in the indoor area in accordance with the position estimate obtained as described. Other examples are also possible.

Figure 2A:
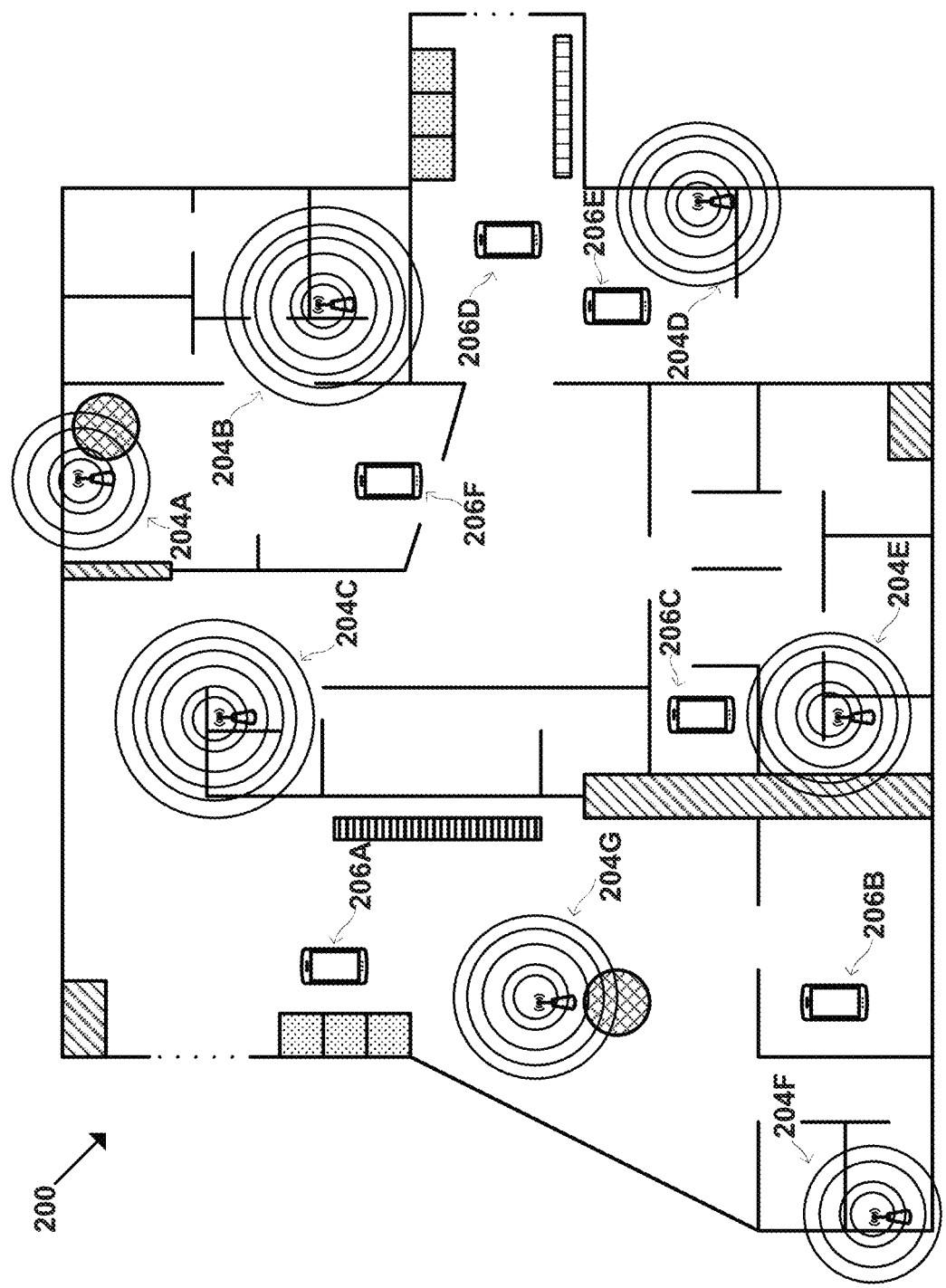
FIGS. 2A and 2B illustrate an indoor area at which radio device(s) and mobile device(s) can be located, in accordance with an example implementation.
Figure 2B:
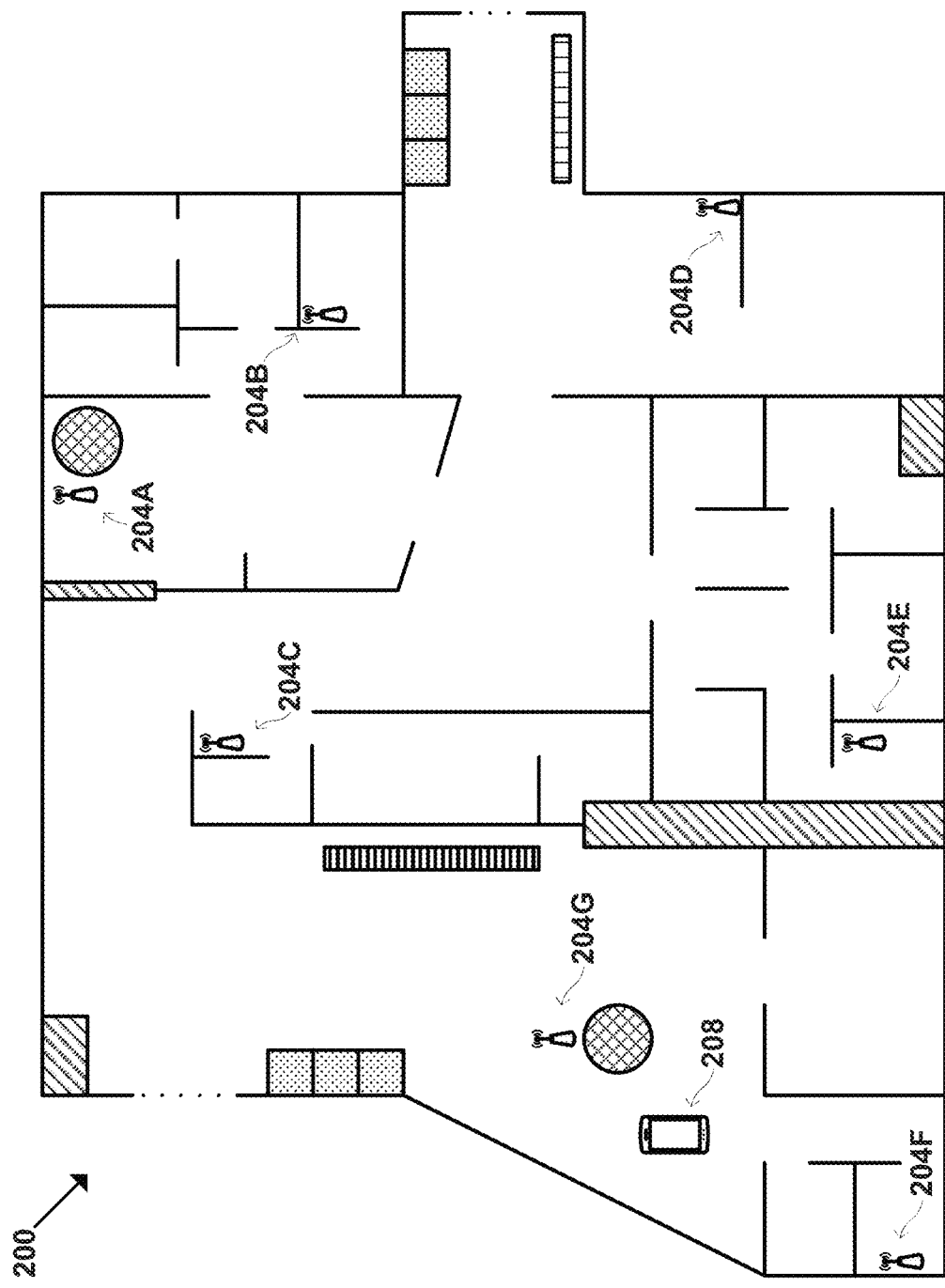
Figure 2C:
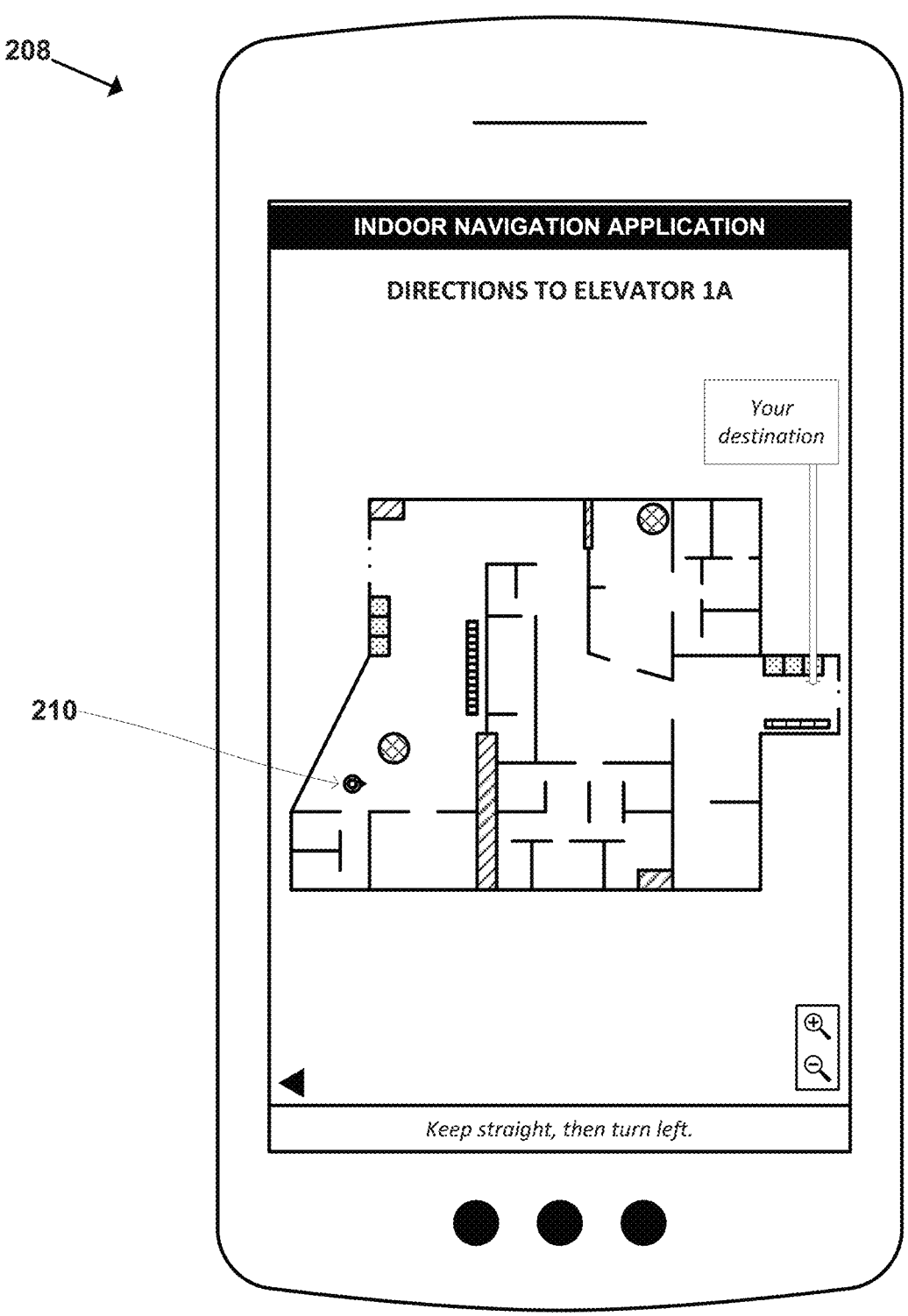
FIG. 2C illustrates an example indoor navigation application, in accordance with an example implementation.

FIGS. 2A to 2C next illustrate an example implementation and use of the above-described positioning solution. Although FIG. 2A to 2C illustrate an implementation in the context of an indoor scenario, it should be understood that the same or similar positioning solution could extend to apply in the context of various outdoor scenarios and implementations.

FIG. 2A illustrates an indoor area 200 taking the form of a floor in a building. As shown, several radio devices 204A-204G are positioned throughout the indoor area 200 and several mobile devices 206A-206F are positioned in and/or moving throughout the indoor area 200. Each of the radio devices 204A-204G emits radio signal(s). Of course, it should be understood that such radio signals are shown for illustration purposes only, and that the illustrated signals do not necessarily indicate coverage, strength, and/or other radio characteristics of those signals. In any case, the mobile devices 206A-206F may each respectively measure the radio signals at issue and then transmit, to a positioning server (e.g., server system 102), fingerprints) indicating position estimate(s) and the corresponding radio measurement(s). In turn, the positioning server may generate or update a radio map for indoor area 200 as described.

FIG. 2B illustrates a mobile device 208 that is positioned in and/or moving through the indoor area 200. The mobile device 208 could be one of the mobile devices 206A-206F that provided fingerprint(s) as described or could be a different mobile device. In either case, the mobile device 208 could observe characteristics a the radio environment at its current position by measuring radio signals emitted by one or more of the radio devices 204A-204G. The mobile device 208 could then refer to the radio map that was generated or updated as described in associated with FIG. 2A, and could determine a position estimate based on the radio characteristics and the radio map as described. Alternatively, the mobile device 208 could transmit, to the positioning server, a request for a position estimate (e.g., a measurement report), which may indicate the observed radio characteristics at issue. In turn, the position server could determine a position estimate based on the radio characteristics and the radio map as described and could then provide the position estimate to the mobile device 208 in response to the request.

FIG. 2C then illustrates how the mobile device 208 could use the position estimate that was determined using the above-described solution. As shown, the mobile device 208 could display an indoor navigation application that includes an open area map of the indoor area 200 as well as a visual indicator 210 of the mobile device 208's position in accordance with the position estimate at issue. Accordingly, the navigation application could use position estimates obtained as described in order to accurately display the current position of the mobile device 208 and/or to help a user of the mobile device 208 accurately navigate through the indoor area 200, among numerous other possibilities. Other illustrations are also possible.

II. Offline Radio Maps for GNSS Rescue Areas

As noted above, the present disclosure is directed to improved approaches for optimizing respective size(s) of partial radio map(s) that can be used by mobile device(s) for purposes of offline radio-based positioning. Advantageously, the approaches can help eliminate or reduce excessive consumption of network, energy, storage, and/or other resources that may otherwise occur due to use of offline radio maps that are unnecessarily too large in data size.

One such disclosed approach involves a mobile device (e.g., mobile device 106) actively 'learning' about device-specific GNSS rescue area(s) and obtaining an offline radio map representative of such area(s). A given device-specific GNSS rescue area can be defined or otherwise described herein as a geographical area visited by the mobile device where GNSS-based position estimates are not obtainable or reliable but where high-quality positioning (e.g., GNSS-like positioning quality) is still deemed valuable or otherwise necessary. Thus, the mobile device obtaining an offline radio map representative of such area(s) advantageously enables offline device positioning optimized according to a usage pattern of the mobile device at issue.

Generally, the mobile device could identify device-specific GNSS rescue area(s) at any feasible time. The mobile device could deem a given area to be a device-specific GNSS rescue area while the mobile device's is physically located in that given area and/or after the mobile device visited that given area. In other words, the mobile device could perform the disclosed identifying process in real-time or could do so after visiting a given area, among other options. Moreover, the mobile device could identify device-specific GNSS rescue area(s) continuously, from time-to-time, in accordance with a pre-defined schedule, in response to a request by, positioning server(s) to do so, and/or in response to any other feasible trigger.

As noted, a device-specific GNSS rescue area is an area visited by the mobile device in which at least one GNSS-based position estimate is or was unavailable. A GNSS-based position estimate being unavailable could, for example, involve the mobile device being unable to determine/obtain a GNSS-based position estimate altogether and/or the GNSS-based position estimate being unreliable or the like. In practice, a GNSS-based position estimate may be unobtainable or unreliable e.g., due to an insufficient number of observable satellites, an insufficient number of observable GNSS signals, weak GNSS signal(s) observed at the mobile device, and/or distorted GNSS signal(s) observed at the mobile device, among other reasons.

In accordance with the present disclosure, the mobile device could determine in various ways that at least one GNSS-based position estimate is or was unavailable in a given area visited by the mobile device. Although certain techniques are described herein, other example technique(s) may be possible as well without departing from the scope of the present disclosure.

In one example, the mobile device could determine that the mobile device has received an insufficient number of reliable (e.g., sufficiently strong and/or undistorted) GNSS signals or an insufficient number of GNSS signals altogether to determine a GNSS-based position estimate in the given area (e.g., less than a threshold number of received signals.)

In another example, the mobile device could determine that a GNSS-based position estimate is unreliable, such as by determining that the GNSS-based position estimate is of low-quality. In this regard, metric(s) indicating a low-quality, GNSS-based position estimate may include or may otherwise be based on one or more of the following: a relatively high positional error (e.g., greater than a pre-defined threshold error), relatively low position accuracy (e.g., lower than a pre-defined accuracy threshold), and/or a relatively low number of satellites associated with determination of the GNSS-based position estimate (e.g., lower than a pre-defined number (e.g., four) of satellites), among numerous other possibilities.

In yet another example, the mobile device could receive an indication e.g., from the mobile device's GNSS receiver, that a GNSS-based position estimate can't be generated or otherwise determined while the mobile device is in the given area or otherwise based on signal(s) that the mobile device observed in that given area. The mobile device could receive such an indication whether or not the mobile device actively evaluates signal characteristic(s) and/or satellite visibility, in line with the examples above. And the mobile device may receive such an indication for any feasible reason, including those contemplated herein or other reasons.

In yet another example, the mobile device could leverage additional information to determine that the mobile device is or was in an area where GNSS is unavailable.

For instance, the mobile device may have stored thereon or have access to additional data indicating e.g., indoor area(s), urban canyon(s), area(s) where flawed (e.g., distorted) or no GNSS signal(s) arrive due to technical satellite issues, and/or area(s) where GNSS "spoofing" or "jamming" device(s) disturb GNSS signal(s), among other possibilities. Such additional data could take the form of map data, building data (e.g., building footprint data and/or building 3D model data) indicating locations and/or characteristics of building(s) and/or urban canyon(s) between building(s), a spoofed locations database indicating where GNSS signals may have been disturbed, and/or radio map data indicating multi-level area(s) and/or GNSS-denied area(s) (e.g., area(s) where radio fingerprint(s) include non-GLASS-based reference location(s)), among others.

So, the mobile device could determine its approximate position (e.g., based on identifier of a nearby radio node or using another position estimation technique (e.g., online radio-based positioning)) and could use the approximate position in combination with the additional data to make a determination that the mobile device is or was in an area where GNSS is unavailable. Alternatively, the mobile device could provide its approximate position to a positioning server and the positioning server could then make the determination at issue and inform the mobile device that the device is or was in an area where GNSS is unavailable, Other examples are also possible.

As noted above, a device-specific GNSS rescue area may also be an area in which the mobile device has or had demand for positioning data of at least a particular quality level. Herein, positioning data could refer to a position estimate or (e.g., radio) data that enables estimation of a position, among other possibilities. Given this, the mobile device having demand for positioning data of at least the particular quality level may correspond to use, in a given area, of an application program or other technical use case on the mobile device that caused the mobile device to perform or attempt to perform operations that required positioning data of at least the particular quality level. In practice, an application program could be any computer program installed or otherwise downloaded onto the mobile device, which may be configured to perform (or cause the mobile device to perforant certain operations e.g., for a particular use case. Other technical use cases could involve e.g., any inputting, outputting, processing, storing, controlling, and/or other operation(s) on the mobile device that trigger demand for positioning data of at least the particular quality level.

By way of example, while the mobile device is in the given area, component(s) of the mobile device could receive a request or other indication that that an application program installed thereon has demand for positioning data of at least a particular quality level. The request or indication may be obtained from the application program installed on the mobile device or from an external entity associated with the application program (e.g., a third-party server). Also, the component(s) at issue may be processor(s), GNSS receiver(s), radio receiver(s), and/or communication interface(s) of the mobile device, among others. In some cases, the application program could trigger the mobile device to communicate with a positioning service (e.g., server(s) associated with a radio-based or GNSS-based positioning service) so as to obtain positioning data such as a position estimate, radio data, and/or GNSS correction data that enables position estimation at at least the particular quality level, among numerous other possibilities. Given this, the mobile device could use such technical interaction(s) with the application program, external entity, and/or positioning service as basis for determining that the mobile device may have demand for positioning data of at least a particular quality level. Other examples are also possible.

In this regard, positioning data being of at least a particular quality level could correspond to the positioning data being of relatively high-quality in accordance with certain metric(s). Example positioning quality metric(s) may include or otherwise correspond to, for example: positioning accuracy, positioning precision, position granularity, positioning coverage, update rate of position estimate, position uncertainty, recency of position estimation, resource (e.g., network or power) consumption associated with a position estimation, characteristic(s) of a positioning-related component (e.g., GNSS or radio receiver), and/or characteristic(s) of positioning algorithm(s) utilized for position estimation. Although some metric(s) have been described, other metric(s) may also be possible as understood by one of ordinary skill in the art.

Given this, the particular quality level could be pre-defined such that the mobile device can determine whether a demanded quality level is of at least the particular quality level. For example, while the mobile device is in a given area where a GNSS-based position estimate is unavailable in line with the description above, the mobile device could determine that the mobile device has a need for a position estimate having at least a certain ('demanded') accuracy level. If this demanded accuracy level is at or above a pre-defined accuracy level of e.g., 5-meter positional accuracy (i.e., there is demand for a more accurate position estimate e.g., 3-meter positional accuracy), then the mobile device could deem the given area to be a device-specific GNSS rescue area. However, if the demanded accuracy level is below the pre-defined accuracy level of e.g., 5-meter positional accuracy (i.e., a less accurate position estimate is sufficient e.g., 10-meter positional accuracy), then the mobile device would not deem the given area to be a device-specific GNSS rescue area. Other examples are also possible.

In some implementations, the particular quality level could be pre-defined to correspond to (e.g., to be at or close to) a quality level associated with GNSS-based positioning, which can be referred to herein as GNSS-like positioning quality level, among other possibilities. In particular, the mobile device could determine that the mobile device has or had demand for a position estimate having at least a GNSS-like positioning quality level. For instance, the mobile device could determine whether positioning quality metric(s) demanded by the mobile device in a given area are substantially close to or exceed respective quality metric(s) associated with GNSS-based positioning. Herein, a demanded positioning quality level substantially corresponding to a GNSS positioning quality level could involve the demanded positioning quality level being close to within a threshold of) a GNSS positioning quality level, even if the demanded positioning quality level is deemed below the GNSS positioning quality level.

In this way, the present disclosure could enable the mobile device to effectively assess whether the mobile device has demand for GNSS-like positioning quality in an area where GNSS is unavailable, so that the mobile device could ultimately compensate for such unavailability by leveraging offline radio-based positioning as further described herein.

In this regard, quality of GNSS-based position estimates could vary depending on various factor(s), such as type of GNSS service and/or configuration of a GNSS receiver, among others. Given this, the particular quality level at issue could be pre-defined based on quality of any given GNSS service in accordance with the present disclosure depending on the quality level deemed desirable, necessary, or otherwise achievable (e.g., by offline radio-based positioning.)

By way of example, a typical GNSS service/receiver could provide for horizontal accuracy within 10 meters under normal (e.g., "open sky") conditions. In this case, the particular quality level at issue could be pre-defined to include accuracy of within 10 meters, so that the mobile device could deem an area to be a GNSS rescue area if the mobile device has demand for positional accuracy of 10 meters or better (e.g., less than 10 meters—such as a demanded accuracy of within 7-meter) in that area. Alternatively, for example, the particular quality level at issue could be pre-defined to include accuracy of within 15 meters, which is close to (but below) a GNSS positioning quality level. Given this, the mobile device could deem an area to be a GNSS rescue area if the mobile device has demand for positional accuracy of 15 meters or better (i.e., close to a GNSS positioning quality level) in that area. Other examples are also possible.

Furthermore, the mobile device may encounter other positioning-related situation(s) when visiting different area(s) and could be configured to assess such area(s) in different ways depending on the situation. By way of example, the mobile device could determine that the mobile device has no demand for positioning services in a given area. So, whether or not GNSS is unavailable in that area, the mobile device may deem the given area to not be a GNSS rescue area based on the determination that the mobile device has no demand for positioning services in the given area. In another example, the mobile device could determine that the mobile device has demand for positioning services in a given area, but no demanded positioning quality level has been specified (e.g., even low-quality positioning could be sufficient for a particular use case.) In this example, whether or not GNSS is unavailable in that area, the mobile device may deem the given area to not be a GNSS rescue area based on the determination that no positioning quality level has been specified. Other examples are also possible.

In line with the discussion above, any feasible type of application program or other technical use case could cause the mobile device to perform or attempt to perform operations that require positioning data of at least a particular quality level. For example, the mobile device could have a ride-sharing application installed thereon, which a user of the mobile device could use to request a vehicle ride from the user's current location to a desired destination. In this context, the ride-sharing application may demand a position estimate having GNSS-like positioning quality, because the ride-sharing service (e.g., associated with the ride-sharing application) may need to provide a driver of the ride-share vehicle with e.g., a highly-accurate location of the mobile device to enable successful pick up of the mobile device's user. Other examples are also possible.

In view of the foregoing, a mobile device could make a determination that a particular area visited by the mobile device is one in which (i) at least one GNSS-based position estimate is or was unavailable and (ii) the mobile device had demand for positioning data of at least a particular quality level. And based at least on making this determination, the mobile device could deem the particular area to be one of the device-specific GNSS rescue area(s).

In this regard, the mobile device could define characteristics of a device-specific GNSS rescue area in any feasible way. For example, a plurality of areas could be pre-defined (e.g., manually or by a positioning server) in accordance with snap tiles, a map-based grid, and/or other factors. So, assuming the mobile device could obtain its approximate position in an area where GNSS is unavailable (e.g., using online radio-based positioning), the mobile device could determine the approximate position is within in a pre-defined area and could responsively define size, shape, and/or other characteristic(s) of a GNSS rescue area to substantially match those of the pre-defined area. In another example, again assuming the mobile device could obtain its approximate position, the mobile device could define a GNSS rescue area to be e.g., an area spanning a pre-defined radius around the approximate position. In yet another example, the mobile device could define a GNSS rescue area to be or include a set of positions visited by the mobile device where the positions at issue are determined to be within a threshold distance of one another and where criteria for establishing a GNSS rescue area has been met in accordance with the description above. In yet another example, the mobile device could use any feasible technique (e.g., using a node identifier) to determine that the mobile device is within or nearby a point of interest (POI) (e.g., a particular building or store), and thus the mobile device could define a GNSS rescue area to span an area of the POI or portion thereof. Other examples are also possible.

In some implementations, the mobile device may use additional criteria as basis for deeming a particular area to be a device-specific GNSS rescue area.

In one example, the mobile device could deem a particular area to be a device-specific GNSS rescue area if the mobile device repeatedly or frequently visits the particular area. In other words, the mobile device could determine that a number or frequency of visits by the mobile device to the particular area is at or above a pre-defined threshold number or frequency of visits and could deem the particular area to be a device-specific GNSS rescue area further based on this determination. In a more specific example, the mobile device could determine both (i) that a particular area meets the criteria for being deemed as a GNSS rescue area as describe herein and (ii) that the mobile device has visited that particular area ten es within one week, which exceeds a pre-defined threshold frequency of visits (e.g., five times within one week).

In another example, the mobile device could deem a particular area to be a device-specific GNSS rescue area if the mobile device has frequent need for high-quality positioning in that area. Namely, a mobile device could determine that the mobile device's demand level meets or exceeds a pre-defined demand criterion, the demand level being for positioning data of at least the particular quality level in the particular area. So, the mobile device could deem the particular area to be a device-specific GNSS rescue area further based on this determination. In this regard, the pre-defined demand criterion be e.g., a number of instances that the mobile device demanded positioning data of at least the particular quality level while in the particular area, perhaps over a certain time period. For example, the pre-defined demand criterion could be set to five instances of such demand within one week. Given this, if the mobile device determines both (i) that a particular area meets the criteria for being deemed as a GNSS rescue area as describe herein and (ii) that the mobile device's demand level in a given week is at or above five instances of demanding high-quality positioning data in the particular area, then the mobile device could deem the particular area to be a device-specific GNSS rescue area. Other examples are also possible.

Once the mobile device identifies device-specific GNSS rescue area(s), the mobile device could receive, from positioning server(s), an offline (partial) radio map representing radio data only for the identified device-specific GNSS rescue area(s). In particular, the mobile device could transmit, to positioning server(s), information indicating identified device-specific GNSS rescue area(s), and the positioning server could use this information as basis for generating the offline radio map at issue. In some case, the mobile device could provide this information as part of a request to the positioning server(s) for the offline radio map. In other cases, the mobile device could provide the information separately from the request at issue. In either case, the mobile device could receive the offline radio map from the positioning server(s) in response to transmitting the request for the offline radio map, Other cases are also possible.

In practice, positioning server(s) could generate the offline radio map in a proactive and/or reactive manner. For example, positioning server(s) could generate the partial radio map in response to a request from the mobile device, which may be a positioning request for obtaining a position estimate and/or a download request for obtaining the offline radio map. In another example, positioning server(s) could generate the partial radio map based on information from the mobile device that indicates identified device-specific GNSS rescue area(s) and could do so with or without any request from a mobile device, so that the offline radio map is proactively generated and ready for transmission to the mobile device. Other examples are also possible.

In line with the discussion above, positioning server(s) could store or otherwise have access to an initial radio map, which could represent radio data for a plurality of areas. This initial radio map could take on various forms and represents various types of areas without departing from the scope of the present disclosure. For instance, the initial radio map could be a global radio map representing radio data for a plurality of areas around the globe, such as for various countries, states, and/or cities etc. The global radio map could be generated based on crowdsourced data collected from various devices around the globe, among other options.

Additionally, the initial radio map could be configured in any feasible manner that can enable facilitating of the disclosed approach. For example, the initial radio map could be configured according to geographical indexing that is sufficiently granular to enable retrieval from a radio map database of radio data for relatively small geographical area(s). In practice, such granularity can be achieved by leveraging currently known and/or future-developed geospatial indexing mechanism(s) used in spatial databases to optimize spatial queries (e.g., "R-tree".)

Given this, positioning server(s) could generate the offline radio map in various ways. For example, positioning server(s) could retrieve, from a radio map database in which the initial radio map is stored, one or more portions of the initial radio map that correspond to device-specific GNSS rescue area(s) that have been identified, such as in accordance with information from the mobile device. In a more specific example, positioning servers) could retrieve radio map tiles that correspond to device-specific GNSS rescue area(s). In practice, the set of retrieved radio map tiles could be considered to be the offline (partial) radio map, or positioning server(s) could process, modify, or otherwise add or remove information from the retrieved radio map tiles as part of the generation of the offline radio map. Other examples are also possible.

In some implementations, positioning server(s) could generate the offline radio map to represent radio data for the device-specific GNSS rescue area(s) and optionally for other area(s) as well all, while maintaining the various benefits of the disclosed approach. The other area(s) at issue may include any area deemed valuable for inclusion other than the device-specific GNSS rescue area(s). For example, positioning server(s) could determine that GNSS is unavailable in a given area only during certain times of the day and that, but this partial GNSS availability may be sufficient to deem this given area as valuable for inclusion e.g., because the mobile device had demand for positioning data of at least a particular quality level in that given area. Thus, positioning server(s) could generate an offline radio map to additionally include radio data for this given area. And as long as inclusion of other area(s) is relatively limited, the disclosed approach could permit for inclusion of radio data for such other area while maintaining a relatively low data size for the offline radio map. Other examples are also possible.

Once positioning server(s) generate the offline radio map at issue, the positioning server(s) could transmit the offline radio map to the mobile device for storage at the mobile device.

In an example implementation, positioning server(s) could transmit the offline radio map to the mobile device via any communication mechanism currently known or developed in the future, such as over Bluetooth, WiFi, or a cellular communication network etc. In practice, such transmission could involve transmitting radio map tiles to the mobile device, so that the mobile device could then store the radio map tiles for purpose of offline position estimates at least in the device-specific GNSS rescue areas that were identified. Other implementations are also possible.

Once the mobile device receives the offline radio map, the mobile device could store the offline radio map in a local data storage device and could use the offline radio map to perform radio-based offline position estimation(s) at least in the device-specific GNSS rescue area(s) that were identified. In this way, the offline radio map at issue can optimally supplement or otherwise augment the mobile device's GNSS-based positioning that may be available other areas so as to result in a seamless, consistent, and reliable overall positioning solution for the mobile device.

In a further aspect of the present disclosure, positioning server(s) can obtain information about GNSS rescue area(s) from various mobile devices so as to compose a 'global' GNSS rescue map. For example, mobile device(s) could learn their respective device-specific GNSS rescue area(s), and each such mobile device could respectively send information about its respective device-specific GNSS rescue area(s) to the positioning server(s). A given mobile device could do so periodically and/or upon request from the positioning server(s) (e.g., as part of a crowdsourcing process). In turn, positioning server(s) can combine such information and over time compose a global GNSS rescue map representative of GNSS rescue areas.

In practice, positioning server(s) (and/or mobile device(s)) could designate identified area(s) as being GNSS rescue area(s) in various ways. By way of example, positioning server(s) could identify a portion of the global radio map in the radio map database that corresponds to a given GNSS rescue area, and programmatically associate the identified portion with a value or the like indicating that the portion represents a GNSS rescue area, such as by storing the association at issue in the radio map database for future reference. In some implementations, this portion could be one or more radio map tiles and thus positioning server(s) could programmatically associate tile ID(s) for an area with value(s) indicating that that the area is a GNSS rescue area. In yet other implementations, the portion at issue could be a representation of geographic coordinate(s) and/or other geographical data point(s), among other options.

Moreover, positioning server(s) could update the global GNSS rescue map at any time, to add and/or remove GNSS rescue area(s). For example, the positioning server(s) could add GNSS rescue area(s) to the global GNSS rescue map in response to the positioning server(s) receiving information from mobile device(s) indicating such GNSS rescue area(s) that are not yet represented or otherwise designated in the global GNSS rescue map. Similarly, the positioning servers) could remove GNSS rescue area(s) from the global GNSS rescue map at any time or for any feasible reason. For example, positioning server(s) could designate an area as being a GNSS rescue area for a (e.g., pre-defined) duration of time, and may remove this designation after this duration expires. In another example, positioning servers) could designate an area as being a GNSS rescue area and could remove this designation in response to receiving any information (e.g., from mobile device(s)) indicating that this area is no longer a GNSS rescue area. In practice, this information could be based on any technique(s) for identifying whether area(s) are GNSS rescue area(s), as contemplated herein. Other examples are also possible.

In view of the foregoing, positioning server(s) could transmit, to a given mobile device, an offline radio map representing a subset of the global GNSS rescue map, so as to provide radio data for one or more of the GNSS rescue areas in the global GNSS rescue map and/or for portion(s) thereof. In some cases, the given mobile device at issue could be one of the mobile devices that has contributed information for generating the global GNSS rescue map in accordance with the aforementioned crowdsourcing process. In other cases, the given mobile device could leverage the global GNSS rescue map without contributing to the crowdsourcing process. In either case, the given mobile device could use the offline radio map for positioning purposes with or without engaging in device-based learning of GNSS rescue area(s). Other cases are also possible.

More specifically, if a given mobile device has demand for high-quality positioning yet GNSS-based positioning is unavailable, the mobile device could send a query to positioning servers) to determine whether it is in a GNSS rescue area. In particular, the mobile device could make a determination that it is visiting or has visited a particular geographic area in which (i) at least one GNSS-based position estimate is or was unavailable to the mobile device and (ii) the mobile device had demand for positioning data of at least a particular quality level, in line with the criteria described above. In response to such a determination, the mobile device could determine its approximate location using any feasible positioning technique that may be available, such as online radio-based positioning, for example. And the mobile device could transmit, to positioning server(s), (i) information indicating an approximate location of the mobile device and/or (ii) a request for an offline radio map, which could include the approximate location of the mobile device, among other possibilities. Based on this approximate location and the global GNSS rescue map, positioning server(s) could determine whether the mobile device is in a GNSS rescue area.

In this process, the positioning server(s) could use the approximate location of the mobile device to determine or otherwise identify a subset of the global GNSS rescue map. In one example, the positioning server(s) could identify, in the global rescue map, GNSS rescue area(s) that are substantially within the approximate location, such as when the approximate location corresponds to an area or a coarse location. In another example, the positioning server(s) could identify, in the global rescue map, GNSS rescue area(s) that encompass the approximate location, such as when the approximate location is determined to be part of the GNSS rescue area(s). In some cases, the positioning server(s) could identify, in the global rescue map, a portion of a GNSS rescue area, such as a portion that substantially spans the coverage and/or shape of the approximate location of the mobile device but does not necessarily include the entirety of the GNSS rescue area. In turn, in such cases, the identified subset may correspond to part of a GNSS rescue area represented by the global GNSS rescue map. Other cases and examples are also possible.

Given this, if positioning server(s) determine that the mobile device is in a GNSS rescue area, the positioning server(s) could perform various operation(s) in accordance with the present disclosure. For example, the positioning server(s) could automatically transmit, to the mobile device, an offline radiomap representing be GNSS rescue area or portion thereof in accordance with the identified subset. In other examples, however, the mobile device could initiate the request for the offline radio map e.g., in accordance with the identified subset.

For instance, positioning server(s) could responsively transmit, to the mobile device, a message recommending that the mobile device obtain an offline radio map representing the GNSS rescue area or portion thereof. Once the mobile device receives this message, the mobile device could determine whether or not to request the offline radio map based on any feasible factor, such as the mobile device's local storage availability and/or available communication bandwidth, among others. Alternatively, the mobile device could automatically determine that the mobile device should request the offline radio map based on the received message. In either case, the mobile device could transmit a request for the offline radio map at issue and positioning server(s) could responsively transmit the offline radio map to the mobile device.

In another instance, the positioning servers) could responsively transmit, to the mobile device, a message providing information about the GNSS rescue area or portion thereof. This information could include information about a shape, coverage area, and/or data size associated with the GNSS rescue area or portion thereof, among other possibilities. And the mobile device could then use this information as basis for determining whether or not to request a corresponding offline radio map. For instance, the mobile device could decide to obtain the offline radio map if the data size is below a pre-defined threshold data size and/or if a use case of the mobile device is expected to have further demand for high-quality positioning in the area at issue (e.g., if a ride-share application is expected to navigate the mobile device's user towards another portion of the area), among other options. So, if the mobile device decides to obtain the offline radio map, the mobile device could transmit a request for the offline radio map at issue and the positioning server(s) could responsively transmit the offline radio map to the mobile device.

In the event that the mobile device makes a determination to not obtain an offline radio map, the mobile device could use another positioning technology for obtaining position estimate in the area at issue. For instance, the mobile device could obtain position estimate(s) using online radio-based positioning, among other options.

On the other hand, in the event that the mobile device does obtain an offline radio map as discussed, the mobile device could then have stored thereon radio data that the mobile device could leverage for positioning purposes while the mobile device is in the area at issue and/or in future instances when the mobile device again visits this area, among other situations.

Overall, one of ordinary skill in the art would recognize that embodiments of the present disclosure provide for numerous technical benefits.

By way of example, because the data size of the offline radio map may end up being relatively small, embodiments of the present disclosure may help eliminate or reduce excessive consumption of communication and/or other computational resources. This could enable positioning server(s) to meet a cost-to-serve criterion associated with reduction in amount of radio data transferred to the mobile device for offline device positioning. For instance, under circumstances where client(s) subscribe to a provider's positioning service in accordance with e.g., a pricing structure that charges a fixed (e.g., annual) fee for the service regardless of usage, the client(s)' usage of the service may result in extensive utilization of the provider's communication and/or other resources, which may increase the provider's cost of providing the service at issue. Thus, from the perspective of a positioning service provider associated with the positioning server(s), the disclosed approach help may decrease the 'cost-to-serve', because less data is transferred from the 'cloud' to the mobile device(s), i.e., out-bound data transfer costs decrease.

In another example, because the data size of the offline radio map may end up being relatively small, embodiments of the present disclosure could help optimize resource usage at the mobile device e.g., by limiting the amount of storage the offline radio map takes up at the mobile device. In particular, embodiments of the present disclosure may help reduce the size of offline radio map(s) obtained by mobile device(s) while ensuring that those offline radio map(s) have optimized data to enable offline positioning in area(s) where such offline positioning capabilities would be beneficial, such as in area(s) where GNSS is not working or reliable but where high-quality positioning is deemed necessary or otherwise beneficial. In this way, a given offline radio map can optimally augment GNSS service to a mobile device, to ensure a seamless positioning service. Other examples and advantages are also possible.

III. Illustrative Methods

FIGS. 3 to 6 are flowcharts illustrating methods 300, 400, 500, and 600, respectively, in accordance with the present disclosure. Such method(s) could be performed by and/or in an arrangement involving mobile device(s), server device(s), and/or any other device or system. Also, it should be understood that, if a given method is performed by a given entity, the given entity could engage in communication(s) with one or more other entities as necessary to obtain and/or provide any feasible information as understood by one of ordinary skill in the art, to enable the given entity to perform operations described herein and/or to inform another entity about results, among other possibilities. Moreover, in some implementations, the various operations described herein could be distributed among one or more entities, such as in accordance with a client-server arrangement or the like.

In an example implementation, methods 300, 400, 500, and/or 600 could be performed by and/or in arrangement(s) (e.g., arrangement 100) involving a device (e.g., mobile device 106) and/or a server (e.g., server system 102) or more particularly by component(s)/module(s) (e.g., processor(s)) thereof, among other possibilities.

Figure 3:
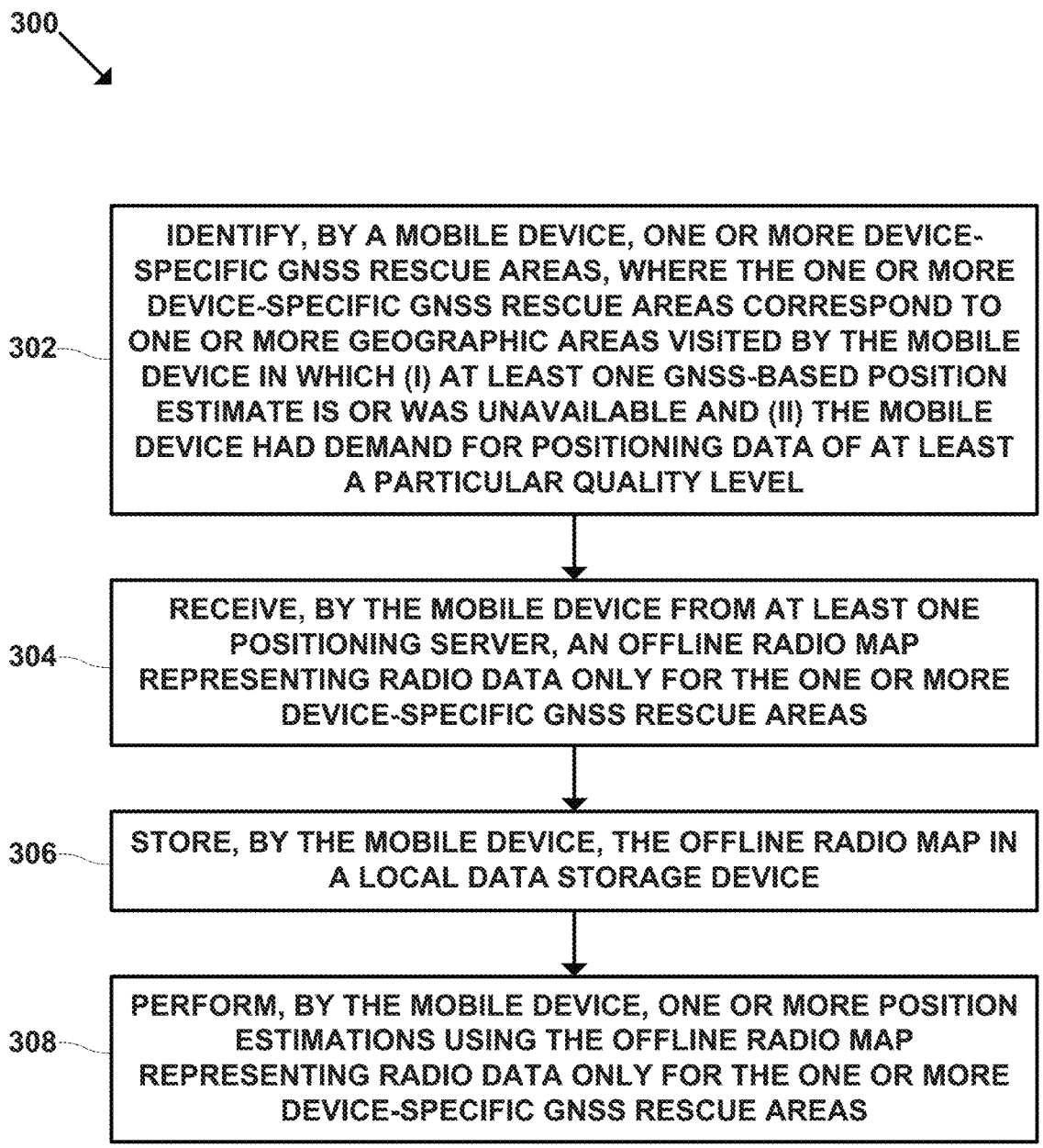
FIG. 3 is an example flowchart related to obtaining an offline radio map based on learning at a mobile device, in accordance with an example implementation.

As shown in FIG. 3, method 300 involves operations for obtaining radio data that enables offline device positioning and is optimized according to a usage pattern of a mobile device, in accordance with blocks 302 to 308. In particular, at block 302, method 300 may involve identifying, by the mobile device, one or more device-specific GNSS rescue areas, where the one or more device-specific GNSS rescue areas correspond to one or more geographic areas visited by the mobile device in which (i) at least one GNSS-based position estimate is or was unavailable and (ii) the mobile device had demand for positioning data of at least a particular quality level. Also, at block 304, method 300 may involve receiving, by the mobile device from at least one positioning server, an offline radio map representing radio data only for the one or more device-specific GNSS rescue areas. Additionally, at block 306, method 300 may involve storing, by the mobile device, the offline radio map in a local data storage device. Further, at block 308, method 400 may involve performing, by the mobile device, position estimations) using the offline radio map representing radio data only for the one or more device-specific GNSS rescue areas.

Figure 4:
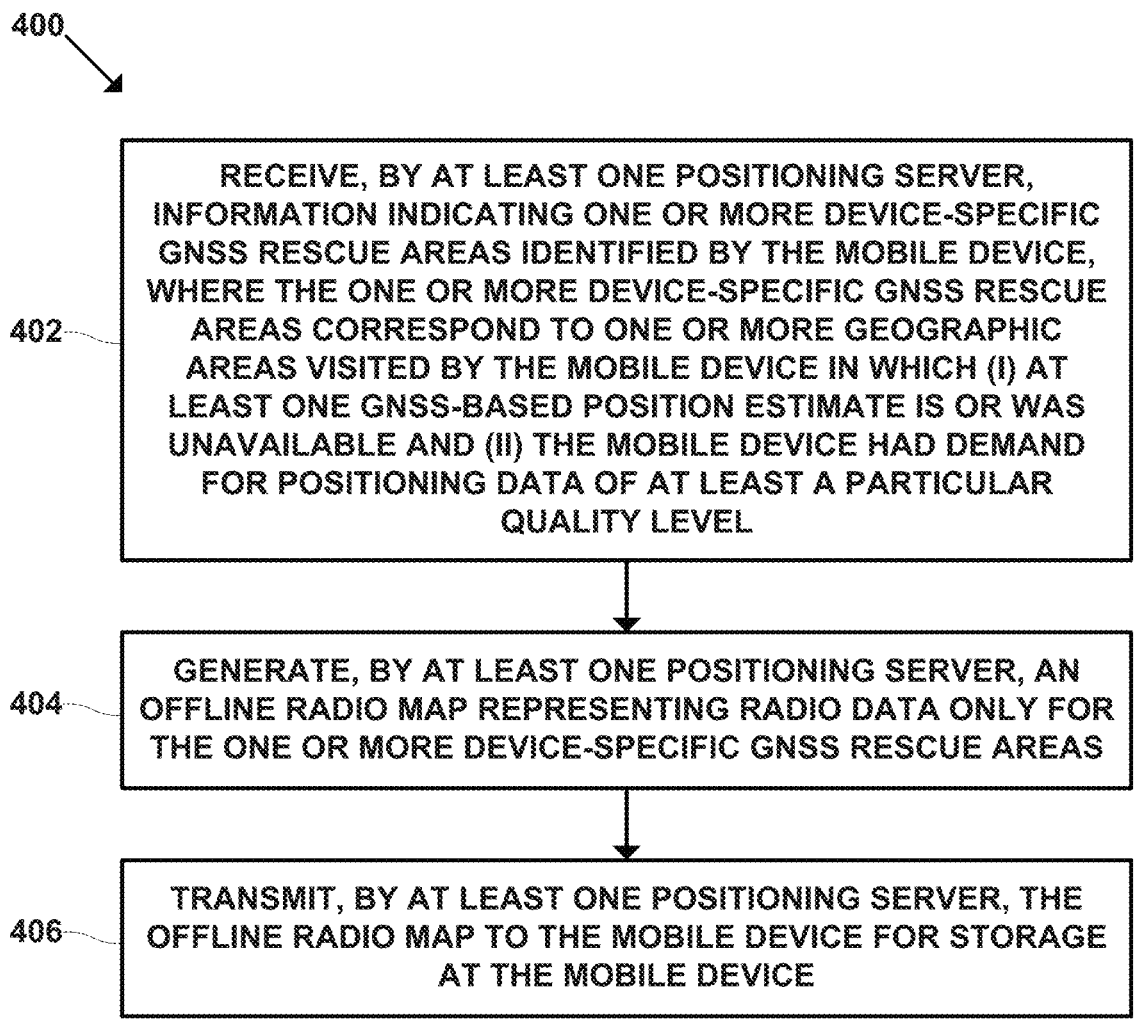
FIG. 4 is an example flowchart related to providing an offline radio map based on learning at a mobile device, in accordance with an example implementation.

As shown in FIG. 4, method 400 involves operations for providing radio data that enables offline device positioning and is optimized according to a usage pattern of a mobile device, in accordance with blocks 402 to 406. In particular, at block 402, method 400 may involve receiving, by one or more processors, information indicating one or more device-specific GNSS rescue areas identified by the mobile device, where the one or more device-specific GNSS rescue areas correspond to one or more geographic areas visited by the mobile device in which (i) at least one GNSS-based position estimate is or was unavailable and (ii) the mobile device had demand for positioning data of at least a particular quality level. Also, at block 404, method 400 may involve generating, by the one or more processors, an offline radio map representing radio data only for the one or more device-specific GNSS rescue areas. Further, at block 406, method 400 may involve transmitting, by the one or more processors, the offline radio map to the mobile device for storage at the mobile device.

Figure 5:
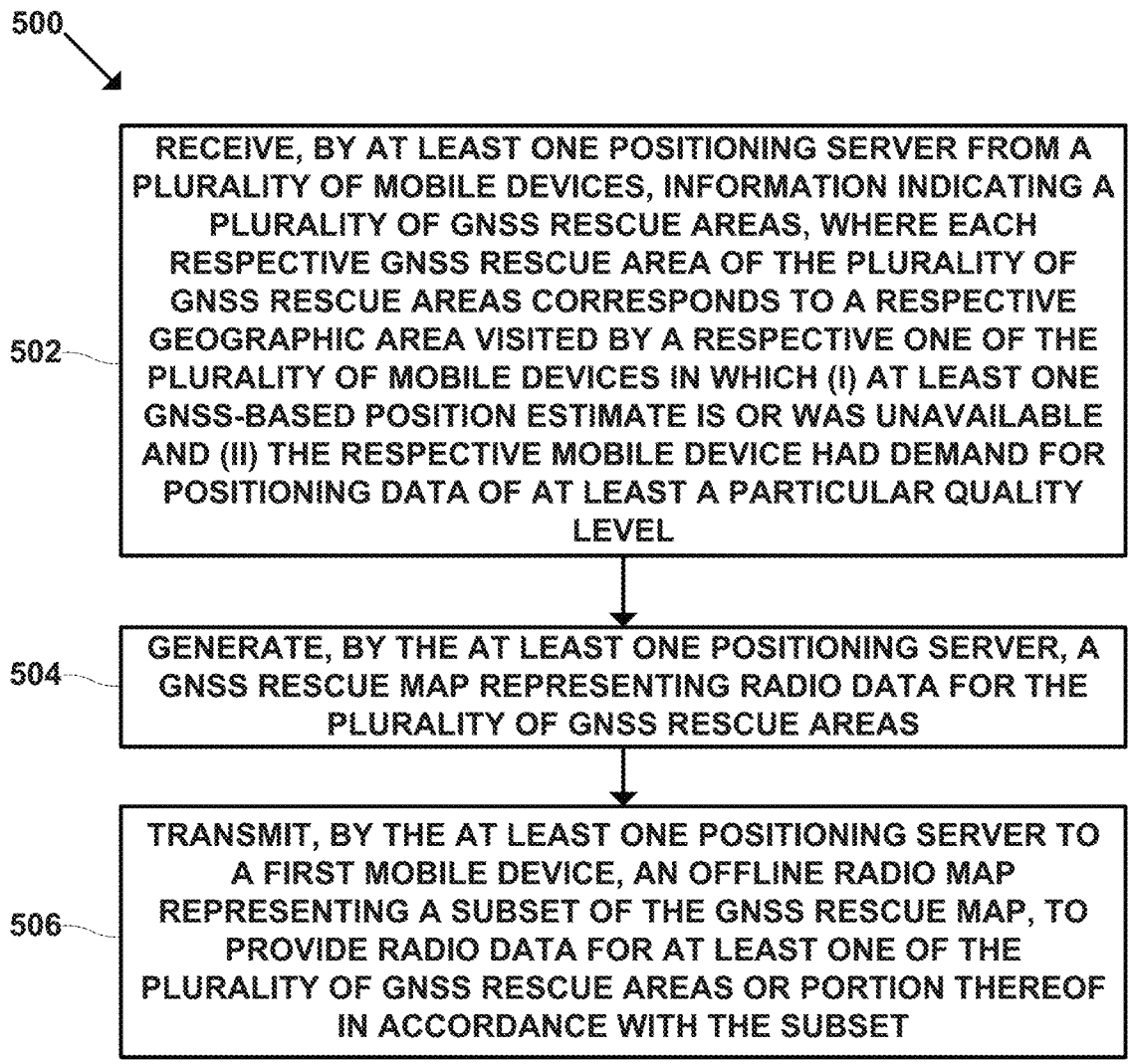
FIG. 5 is an example flowchart related to obtaining an offline radio map based on crowdsourced data from mobile devices, in accordance with an example implementation.

As shown in FIG. 5, method 500 involves operations in accordance with blocks 502 to 506. In particular, at block 502, method 500 may involve receiving, by at least one positioning server from a plurality of mobile devices, information indicating a plurality of GNSS rescue areas, where each respective GNSS rescue area of the plurality of GNSS rescue areas corresponds to a respective geographic area visited by a respective one of the plurality of mobile devices in which (i) at least one GNSS-based position estimate is or was unavailable and (ii) the respective mobile device had demand for positioning data of at least a particular quality level. Also, at block 504, method 500 may involve generating, by the at least one positioning server, a GNSS rescue map representing radio data for the plurality of GNSS rescue areas. Further, at block 506, method 500 may involve transmitting, by the at least one positioning server to a first mobile device, an offline radio map representing a subset of the GNSS rescue map, to provide radio data for at least one of the plurality of GNSS rescue areas or portion thereof in accordance with the subset.

As shown in FIG. 6, method 600 involves operations in accordance with blocks 602 to 604 In particular, at block 602, method 600 may involve transmitting, by a first mobile device to at least one positioning server, one or more of (i) information indicating an approximate location of the first mobile device or (ii) a request for an offline radio map, the request including the approximate location of the first mobile device, where the at least one positioning server has access to a GNSS rescue map that represents radio data for a plurality of GNSS rescue areas and is generated based on crowdsourced data from a plurality of mobile devices, and where each respective GNSS rescue area of the plurality of GNSS rescue areas corresponds to a respective geographic area visited by a respective one of the plurality of mobile devices in which (i) at least one GNSS-based position estimate is or was unavailable and (ii) the respective mobile device had demand for positioning data of at least a particular quality level. Further, at block 604, method 600 may involve, in response to the transmitting, receiving, by the first mobile device from the at least one positioning server, an offline radio map representing a subset of the GNSS rescue map, to obtain radio data for at least one of the plurality of GNSS rescue areas or portion thereof in accordance with the subset.

Although certain methods have been described, it should be understood that other processes and/or modification of one or more of the described processes may also be possible in the context of the present disclosure.

IV. Example Hardware and Software

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
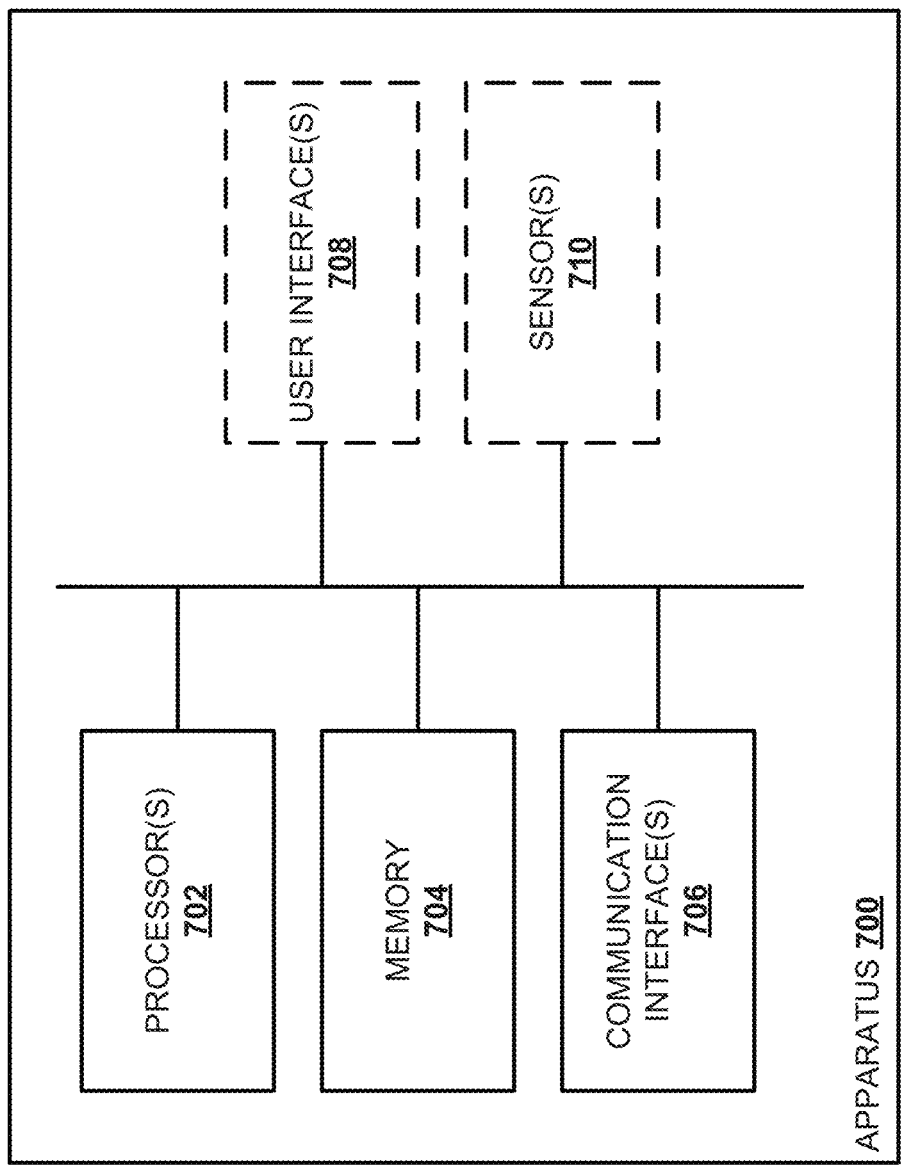
FIG. 7 illustrates an example apparatus, in accordance with an example implementation.

FIG. 7 is a schematic block diagram of an apparatus 700 that may be involved in a feedback loop for improving performance of a radio-based positioning system, according to an example embodiment. The apparatus 700 could, for instance, represent a server (e.g., server system 102) or a mobile device (e.g., one of the mobile devices 106), among other options. Moreover, the apparatus 700 could take the form of or otherwise be part of a system, such as any of those described herein.

As shown, apparatus 700 could include processor(s) 702, a memory 704 (e.g., database 108), communication interface(s) 706, an (optional) user interface(s) 708, and (optional) sensor(s) 710. Some or all of the components of the apparatus 700 may be connected via a bus (or other mechanism) and/or be combined into one or more modules.

Processor(s) 702 could have numerous functions, such as controlling the memory 704, communication interface(s) 706, the user interface(s) 708, and/or the sensor(s) 710 in any feasible manner currently known or developed in the future. For example, the memory 704 could include or otherwise contain computer program code (program instructions), and the processor(s) 702 may be configured to execute the program code to cause the apparatus 700 to perform and/or control operations, such as any of those described herein and/or other operations. Thus, apparatus 700 and/or processor(s) 702 could be referred to as carrying out such operations.

Moreover, processor(s) 702 (and also any other processor(s) mentioned herein) may be processor(s) of any suitable type. For example (and without limitation), processor(s) 702 may, include: one or more microprocessor(s), one or more processor(s) with accompanying one or more digital signal processor(s), one or more processor(s) without accompanying digital signal processor(s), one or more special-purpose computer chips, one or more FPGA(s), one or more controller(s), one or more ASIC(s), one or more computer(s), any structure/hardware that has been programmed in such a way to perform described operation(s), and/or an application processor that runs an operating system, among other possibilities.

Furthermore, memory 704 could also take various form without departing from the scope of the present disclosure. In particular, memory 704 could be separate from processor(s) 702. Additionally or alternatively, memory 704 may be part of or otherwise integrated with one or more of the processor(s) 702. In this case, memory 704 may be fixed to the from processor(s) 702 or may be at least partially removable from the processor(s) 702. In any case, the memory 704 be or take the form of volatile and/or non-volatile memory; and could include program memory, working memory; and/or data memory, among others.

By way of example (and without limitation), memory 704 could be or otherwise include: FLASH memory (or a part thereof), any of a Read-Only Memory (ROM), PROM, EPROM and EEPROM memory (or a part thereof), a hard disc (or a part thereof), a Random Access Memory (RAM); and/or Dynamic RAM (DRAM), among others. In some cases, memory 704 may additionally or alternatively include an operating system for processor(s) 702 and/or firmware for apparatus 700. Further, memory 704 could additionally or alternatively be used by processor(s) 702 when executing an operating system and/or computer program. Moreover, memory 704 could additionally or alternatively store data, such as any types, sets, instances, and/or samples of data described herein. Other examples are also possible.

Further, communication interface(s) 706 could enable the apparatus 700 to communicate with other entities. The communication interface(s) 706 may, for instance, include a wireless interface (e.g. a cellular radio communication interface and/or a WLAN interface) and/or wire-bound interface (e.g. an IP-based interface, for instance to communicate with entities via the Internet). Moreover, the communication interface(s) 706 may take the form of or provide for wireless and/or wired communication with transmitting and/or receiving device(s), such as one or more antenna(s) and/or radio receiver(s) of the apparatus 700.

Yet further, user interface(s) 708 could be any device(s) for presenting and/or receiving information. For instance, user interface(s) 708 include display device(s), audio device(s) or the like for visually and/or audibly providing information (e.g., to a user). Additionally or alternatively, user interface(s) 708 could include input device(s) (e.g. a keyboard, keypad, touchpad, mouse, etc.) for receiving information (e.g., based on input provided by a user).

Finally, sensor(s) 710 could include any type(s) of sensor(s) currently known and/or developed in the future. For example, sensor(s) 710 could include a barometric sensor (e.g., to gather pressure information), motion sensor(s) (e.g., inertial measurement unit (MU)), image capture device(s), position sensor(s), Global Navigation Satellite System (GNSS) receiver(s) (e.g., in the form of a Global Positioning System (GPS) receiver), and/or any (currently known and/or future-developed) sensor(s) that enable the apparatus 700 to perform radio measurements e.g., Bluetooth and/or receiver(s)), among other possibilities.

In a further aspect, the term "computer-readable medium" as used herein may refer to any medium that participates in providing information to processor(s), including instructions for execution. Such a medium may take many forms, including, but not limited to computer-readable storage medium (e.g., non-volatile media, volatile media), and/or transmission media. Non-transitory media, such as non-volatile media, may include, for example, optical or magnetic disks, such as storage device. Volatile media may include, for example, a dynamic memory. Transmission media may include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Generally speaking, common forms of computer-readable media may include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read.

In some cases, the term computer-readable storage medium may be used herein to refer to any computer-readable medium except transmission media. Further, logic encoded in one or more tangible media may includes processor instructions on a computer-readable storage media and/or special purpose hardware (e.g., ASIC).

In practice, a computer-readable storage medium could have stored thereon instructions executable by processor(s) to cause an apparatus to perform operations, such as any of those described herein. Accordingly, a computer program could be stored in a computer readable storage medium in the form of instructions encoding the computer readable storage medium. The computer-readable storage medium may be intended for taking part in the operation of a device, like an internal or external memory or hard disk of a computer, or be intended for distribution of the program, like an optical disc, among other options.

V. Example Geographic Database

Figure 8:
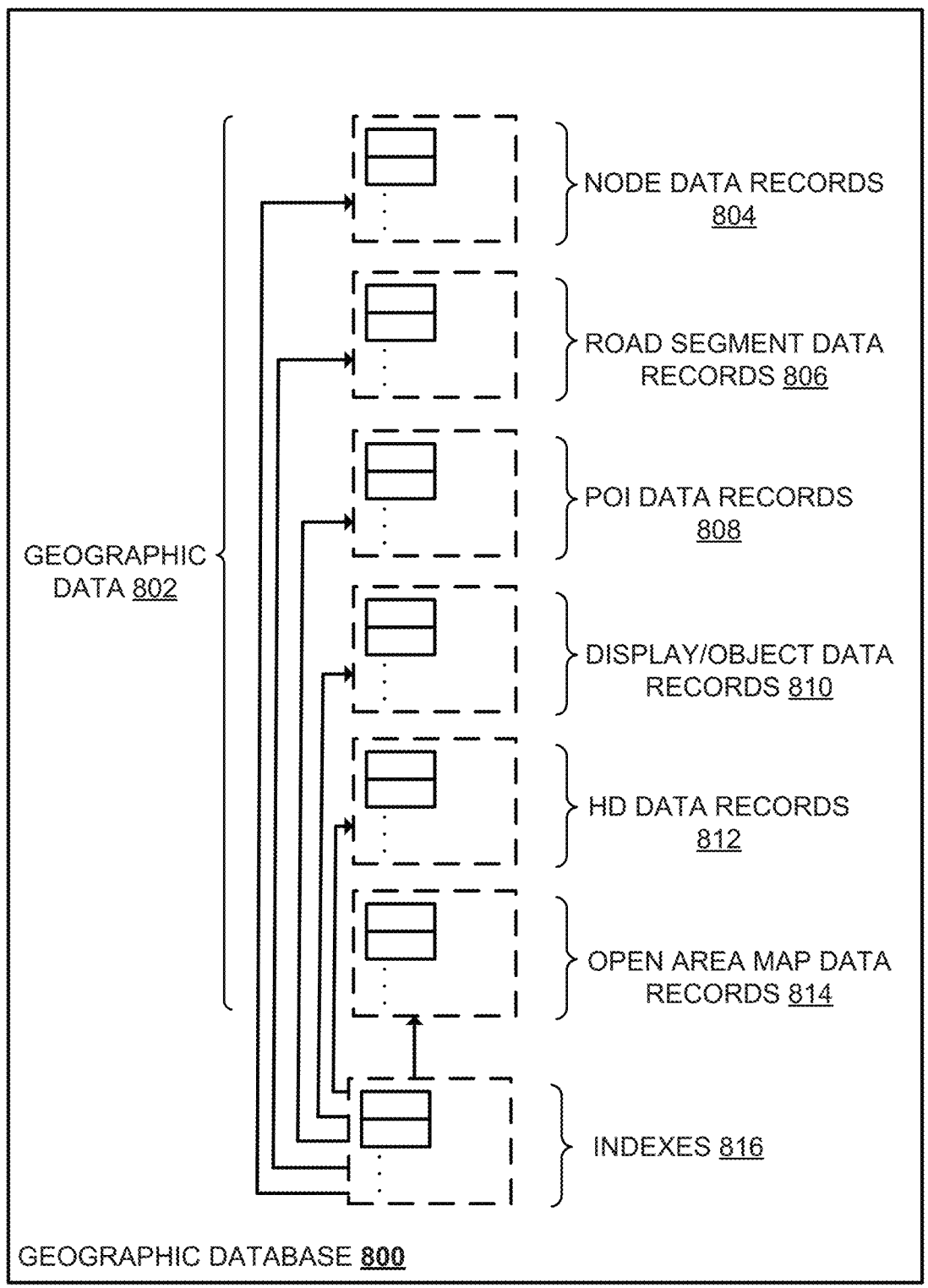
FIG. 8 illustrates a diagram of a geographic database, in accordance with an example implementation.

FIG. 8 illustrates a diagram of a geographic database 800, according to an example implementation. Geographic database 800 could be included within, integrated with, or be separate from another database, data storage device, memory, or the like described herein (e.g., memory 704). Additionally or alternatively, geographic database 800 could be stored on or otherwise made accessible to any entity described herein without departing from the scope of the present disclosure. Moreover, although certain aspects of the geographic database are described in the context of outdoor mapping and/or outdoor navigation-related services, it should be understand that some or all such aspects could extend to apply in the context of indoor mapping and/or indoor navigation-related services.

In this regard, the terms indoors, indoor area, indoor space, indoor environment, or the like used herein could refer any physical area/space that is at least partially enclosed, such as, e.g., for purpose of at least partially covering people and/or object(s) (e.g., a building, home, venue, tunnel, etc.) And the terms outdoors, outdoor area, outdoor space, outdoor environment, or the like used herein could refer to any physical areas/spaces other than those that are indoors (e.g., a park, street, intersection, sidewalk, beach, plaza, etc.) Of course, the terms indoors and outdoors or the like can be defined in other ways as well.

More specifically, the geographic database 800 may include geographic data 802 used for (or configured to be compiled to be used for) mapping and/or navigation-related services. For instance, the geographic database 800 may include high resolution or high definition (HD) mapping data that provide centimeter-level or better accuracy of map features. By way of example, the geographic database 800 can be based at least in part on Light Detection and Ranging (LiDAR) and/or other technology to collect billions of 3D points and model road surfaces (and/or other map features down), e.g., to the number lanes and their widths. In some cases, the HD mapping data (e.g., data records 812) may capture and store details such as the slope and curvature of the road, lane markings, roadside objects such as sign posts, including what the signage denotes, and/or shape/sizes of indoor objects, hallways, rooms etc. In practice, the HD mapping data may enable precise localization of an entity on a road and or in a building, and/or may enable determination of map data updates (e.g., learned speed limit values) to at high accuracy levels, among other options.

In the geographic database 800, geographic features (e.g., two-dimensional or three-dimensional features) may be represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In this regard, the following terminology may apply to the representation of geographic features in the geographic database 800.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In an example implementation, the geographic database 800 may follow certain conventions. For example, links might not cross themselves and might not cross each other except at a node. Also, there may be no duplicated shape points, nodes, or links. Two links that connect each other may have a common node. In the geographic database 800, overlapping geographic features may be represented by overlapping polygons. When polygons overlap, the boundary of one polygon may cross the boundary of the other polygon. In the geographic database 800, the location at which the boundary of one polygon intersects the boundary of another polygon may be represented by a node. In an embodiment, a node may be used to represent other locations along the boundary of a polygon than a location at which the boundary of the polygon intersects the boundary of another polygon. Additionally or alternatively, a shape point may not be used to represent a point a which the boundary of a polygon intersects the boundary of another polygon.

In an example implementation, the geographic database 800 may be stored as a hierarchical or multi-level tile-based projection or structure. More specifically, in one embodiment, the geographic database 800 may be defined according to a normalized Mercator projection. Other projections may be used. By way of example, the map tile grid of a Mercator or similar projection may be a multilevel grid. Each cell or tile in a level of the map tile grid may be divisible into the same number of tiles of that same level of grid. In other words, the initial level of the map tile grid (e.g., a level at the lowest zoom level) may be divisible into four cells or rectangles. Each of those cells are in turn divisible into four cells, and so on until the highest zoom or resolution level of the projection is reached.

In some implementations, the map tile grid may be numbered in a systematic fashion to define a tile identifier (tile ID). For example, the top left tile may be numbered 00 the top tight tile may be numbered 01, the bottom left tile may be numbered 10, and the bottom right tile may be numbered 11. Further, each cell may be divided into four rectangles and numbered by concatenating the parent tile ID and the new tile position. A variety of numbering schemes also is possible. Any number of levels with increasingly smaller geographic areas may represent the map tile grid. Any level (n) of the map tile grid may have 2(n+1) cells. Accordingly, any tile of the level (n) has a geographic area of A/2(n+1) where A is the total geographic area of the world or the total area of the map tile grid 10. Because of the numbering system, the exact position of any, tile in any level of the map tile grid or projection may be uniquely determined from the tile ID.

In this regard, a system may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In an embodiment, the quadkey is an example of the hash or encoding scheme of the respective geographical coordinates of a geographical data point that can be used to identify a tile in which the geographical data point is located.

As shown, the geographic database 800 may include node data records 804, road segment or link data records 806, Points of Interest (POI) data records 808, display/object data records 810, HD mapping data records 812, open area map data records 814, and indexes 816, for example. More, fewer or different data records can be provided. For example, other data records can include cartographic data records, routing data, and/or maneuver data. Further, the indexes 816 may improve the speed of data retrieval operations in the geographic database 800. For instance, the indexes 816 may be used to quickly locate data without having to search every row in the geographic database 800 every time it is accessed. For example, in one embodiment, the indexes 816 can be a spatial index of the polygon points associated with stored feature polygons.

In exemplary embodiments, the road segment data records 806 may be links or segments representing roads, streets, or paths, as can be used in a calculated or recorded route information for determination of one or more personalized routes. The node data records 804 may be end points corresponding to the respective links or segments of the road segment data records 806. The road segment data records 806 and the node data records 804 may represent a road network, such as used by vehicles, cars, and/or other entities. Alternatively, the geographic database 800 can contain path segment(s) and node data records or other data that represent pedestrian paths or areas in addition to or instead of the vehicle road record data (e.g., paths and/or areas for indoor and/or outdoor positioning and/or navigation), for example.

The road/link segments and nodes can be associated with attributes, such as geographic coordinates, street names, address ranges, speed limits, turn restrictions at intersections, and other navigation related attributes, room names/identifiers, vertical connector names/identifiers, as well as POIs, such as gasoline stations, hotels, restaurants, museums, stadiums, offices, automobile dealerships, auto repair shops, buildings, stores, parks, interior building features etc. The geographic database 800 can include data about the POIs and their respective locations in the POI data records 808. The geographic database 800 can also include data about places, such as cities, towns, or other communities, and other geographic features, such as bodies of water, mountain ranges, etc. Such place or feature data can be part of the POI data records 808 or can be associated with POIs or POI data records 808 (such as a data point used for displaying or representing a position of a city). Other examples are also possible.

In some implementations, the geographic database 800 can include display/object data records 810 for storing machine-readable visual representations and map data decoded from the visual representations and their respective properties. In addition, the display/object data records 810 can store post-processing rule sets for correcting and/or reducing the uncertainties in the display/object data decoded from clustered machine-readable visual representations. The display/object data records 800 can also store data selection rules e.g., in a map data extension layer) for selecting from among multiple sets of readings of a machine-readable visual representation. The display/object data records 800 can also store confidence or accuracy determinations for the decoded map data. By way of example, the display/object data records 800 can be associated with one or more of the node records 804, road segment records 806, and/or POI data records 808 to support uses cases such as enhanced mapping user interfaces (UIs), autonomous driving, dynamic map updates, etc. In some cases, the display/object data records 810 may be stored as a data layer of the hierarchical tile-based structure of the geographic database 800 according to the various embodiments described herein.

In some implementations, as discussed above, the HD mapping data records 812 could model map features to centimeter-level or better accuracy. The HD mapping data records 911 may be divided into spatial partitions of varying sizes to provide HD mapping data to vehicles and/or other devices with near real-time speed without overloading the available resources of the vehicles and/or devices (e.g., computational, memory, bandwidth, etc. resources).

In an example implementation, the geographic database 800 can be maintained by a content provider in association with a services platform (e.g., a map developer). The map developer can collect geographic data to generate and/or enhance the geographic database 800. There can be different ways used by the map developer to collect data. These ways can include obtaining data from other sources, such as municipalities or respective geographic authorities. Additionally or alternatively, the map developer can employ field personnel to travel along roads and/or inside buildings (or other indoor areas) throughout the geographic region to observe features and/or record information about them, for example. Additionally or alternatively, remote sensing, such as aerial or satellite photography, can be used.

Generally, the geographic database 800 can be a master geographic database stored in a format that facilitates updating, maintenance, and/or development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data can be compiled (such as into a platform specification format (PSF)) to organize and/or configure the data for performing navigation-related functions and/or services, such as route calculation, route guidance, map display, speed calculation, distance and travel time functions, and other functions, by a navigation or other device. The navigation-related functions can correspond to vehicle navigation, pedestrian navigation, or other types of navigation. The compilation to produce end user databases can be performed by a party or entity separate from the map developer. For instance, a customer of the map developer, such as a navigation device or other end user device developer, can perform compilation on a received geographic database in a delivery format to produce one or more compiled navigation databases.

In a further aspect, as noted, the geographic database 800 could additionally or alternatively include open area map data record(s) 814 for open area map(s). Generally speaking, open area map(s) may include image(s) or the like of respective layout(s) representing pedestrian walkable area(s) (e.g., indoor area(s), such as one or more floors of a building), and may be configured, separately or together, to enable or otherwise provide point-to-point routing within the layout(s). For example, in line with the discussion above, a radio map could include, be combined with, or otherwise correspond to an open area map representing features of an indoor and/or outdoor area at various locations in the area, to enable positioning and/or navigation solution(s) for the area. Other examples are also possible.

In an example implementation, an open area map may be positioned in, on, or over a geographic map or database (e.g., geographic database 800). The geographic map may be or include geographic data (e.g., any feasible data from records 804-812) corresponding to an area other than (or perhaps at least partially overlapping with) the area represented in the open area map. Also, the geographic map may represent compiled data that corresponds to a database or map configured for vehicle and/or pedestrian navigation. Alternatively, the geographic map may correspond to any real-world or geographic map or data that may or may not be used for navigation or routing. In any case, the geographic map may, e.g., include, but is not limited to, a road network. The road network may represent real-world roads or paths, such as in a city or other geographic region. Navigation attributes and POIs may also be provided.

In this regard, the open area map may be associated or linked with the geographic map or data. For example, one or more points or coordinates of the open area map may be aligned or positioned in or with one or more points or coordinates of the geographic map or data. In one embodiment, coordinates corresponding to tiles, objects, or other portion of the open area map may be in, translated to, or converted to real-world coordinates, such as longitude or latitude, Universal Transverse Mercator ("UTM") coordinates, or other rectangular or 3D coordinates, such as altitude or elevation points. Based on the real-world coordinates, the open area map or data thereof may be placed, positioned, or aligned with or within the geographic map.

For example, nodes, segments, or other features of the geographic map may correspond to real-world coordinates, such as longitude, latitude, and/or UTM coordinates as well as elevation or altitude information. Accordingly, by knowing the real-world coordinates of the open area map, the open area map may be accurately linked to a real-world position or location in the geographic map (e.g., geographic database 800 and/or a display). Additionally or alternatively, the coordinates or points of the open area map or data thereof may be linked or associated with a road network, such as road segments, nodes, and/or other features, without reference to real-world coordinates.

Given this, an end user may perform point-to-point routing using the open area map while viewing a surrounding geographic area or map. Also, the open area map may be linked to the geographic map for navigation or routing purposes, such as via point or navigation data.

For example, an end user may want to navigate or route from inside the open area map to a point external to the open area map that is covered in the geographic map, or vice versa (e.g., an indoor-to-outdoor transition and/or an outdoor-to-indoor transition). Accordingly, a route may be calculated and/or displayed in the open area map (e.g., in the context of indoor navigation), and then from a transition point or area, the route or second route (a continuing route to a selected destination outside of the open area map) may be calculated and/or displayed based on route calculation of the geographic map.

In this regard, in some cases, the navigation or routing of the geographic map may be different than the point-to-point routing of the open area map. For example, the routing of the geographic map may be based on vehicle and/or pedestrian navigation attributes of set roadways, and the routing of the open area map may be based on pedestrian navigation attributes of set indoor features (e.g., hallways, lobbies, rooms etc.) But in other cases, the navigation or routing of the geographic map could be the same as or similar to the point-to-point routing of the open area map.

In any case, in other implementations, an open area map may be positioned in or associated with the geographic map without being linked or tied in with navigation or routing features or functions of the geographic map. Namely, the routing or navigation of at least some open area map(s) may be independent or separate from routing or navigation of an associated geographic map. Other examples and aspects are also possible.

VI. Conclusion

Any connection described herein is to be understood in a way that the involved components are operationally coupled. Thus, the connection(s) can be direct or indirect with any number or combination of intervening elements, and there may be merely a functional relationship between the components.

Moreover, any of the methods, processes and actions described or illustrated herein may be implemented using executable instructions in a general-purpose or special-purpose processor(s) and stored on a computer-readable storage medium (e.g., disk, memory, or the like) to be executed by such processor(s).

The expression "A and/or B" is considered to comprise any one of the following three scenarios: (i) A. (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any, feature presented for a particular example embodiment may be used with any aspect of the disclosure on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily, shown in the figures shall be considered as one possible sequence of method steps for the respective embodiment described by the respective figure.

The present disclosure has been described by means of example embodiments. It should be noted that there are alternative ways and variations which are obvious to a skilled person in the art and can be implemented without deviating from the scope of the present disclosure.

Many modifications and other embodiments of the present disclosure set forth herein will come to mind to one skilled in the art to which the present disclosure pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method comprising:
   receiving, by at least one positioning server from a plurality of mobile devices, information indicating a plurality of Global Navigation Satellite System (GNSS) rescue areas, wherein each respective GNSS rescue area of the plurality of GNSS rescue areas corresponds to a respective geographic area visited by a respective one of the plurality of mobile devices in which (i) at least one GNSS-based position estimate is or was unavailable and (ii) the respective mobile device had demand for positioning data of at least a pre-defined accuracy level;
   generating, by the at least one positioning server, a GNSS rescue map representing radio data for the plurality of GNSS rescue areas; and
   transmitting, by the at least one positioning server to a first mobile device, an offline radio map representing a subset of the GNSS rescue map, to provide radio data for at least one of the plurality of GNSS rescue areas or portion thereof in accordance with the subset.

2. The method of claim 1, further comprising:
   receiving, by the at least one positioning server from the first mobile device, information indicating an approximate location of the first mobile device; and
   based at least on the approximate location of the first mobile device, determining, by the at least one positioning server, the subset of the GNSS rescue map.

3. The method of claim 2, wherein determining the subset of the GNSS rescue map based at least on the approximate location of the first mobile device comprises:
   (i) identifying at least one GNSS rescue area, from among the plurality of GNSS rescue areas, or portion thereof that is within the approximate location or encompasses the approximate location, and
   (ii) deeming the identified at least one GNSS rescue area or portion thereof as the subset to be included in the offline radio map.

4. The method of claim 2, wherein receiving information indicating the approximate location of the first mobile device comprises receiving, from the first mobile device, a request for the offline radio map, the request including the approximate location of the first mobile device.

5. The method of claim 2, further comprising:
   transmitting, by the at least one positioning server to the first mobile device, a message (i) recommending that the first mobile device obtain the offline radio map representing the subset of the GNSS rescue map, or (ii) providing information about the subset of the GNSS rescue map.

6. The method of claim 5, further comprising:
   in response to transmitting the message, receiving, by the at least one positioning server from the first mobile device, a request for the offline radio map,
   wherein the at least one positioning server transmits the offline radio map in response to receiving the request.

7. The method of claim 5, wherein the information about the subset of the GNSS rescue map comprises information about one or more of: at least one shape or at least one coverage area associated with the subset of the GNSS rescue map.

8. The method of claim 1, wherein the respective mobile device having demand for positioning data of at least the pre-defined accuracy level corresponds to use of an application or program on the respective mobile device that caused the respective mobile device to perform or attempt to perform operations that required positioning data of at least the pre-defined accuracy level.

9. The method of claim 1, wherein the pre-defined accuracy level substantially corresponds to a positioning quality level provided by GNSS-based positioning.

10. The method of claim 1, wherein the first mobile device is one of the plurality of mobile devices.

11. The method of claim 1, wherein the first mobile device is separate from the plurality of mobile devices.

12. A method comprising:
   transmitting, by a first mobile device to at least one positioning server, one or more of (i) information indicating an approximate location of the first mobile device or (ii) a request for an offline radio map, the request including the approximate location of the first mobile device,
   wherein the at least one positioning server has access to a GNSS rescue map that represents radio data for a plurality of GNSS rescue areas and is generated based on crowdsourced data from a plurality of mobile devices, and
   wherein each respective GNSS rescue area of the plurality of GNSS rescue areas corresponds to a respective geographic area visited by a respective one of the plurality of mobile devices in which (i) at least one GNSS-based position estimate is or was unavailable and (ii) the respective mobile device had demand for positioning data of at least a pre-defined accuracy level; and in response to the transmitting, receiving, by the first mobile device from the at least one positioning server, an offline radio map representing a subset of the GNSS rescue map, to obtain radio data for at least one of the plurality of GNSS rescue areas or portion thereof in accordance with the subset.

13. The method of claim 12, wherein the subset of the GNSS rescue map is based at least on the approximate location of the first mobile device.

14. The method of claim 12, further comprising:

making a determination, by the first mobile device, that the first mobile device is visiting or has visited a particular geographic area in which (i) at least one GNSS-based position estimate is or was unavailable to the first mobile device and (ii) the first mobile device had demand for positioning data of at least the particular quality level, wherein the first mobile device transmits the information indicating the approximate location of the first mobile device in response to making the determination.

15. The method of claim 12, further comprising:

receiving, by the first mobile device from the at least one positioning server, a message (i) recommending that the first mobile device obtain the offline radio map representing the subset of the GNSS rescue map, or (ii) providing information about the subset of the GNSS rescue map, wherein the first mobile device transmits the request for the offline radio map in response to receiving the message.

16. The method of claim 15, wherein the information about the subset of the GNSS rescue map comprises information about one or more of: at least one shape or at least one coverage area associated with the subset of the GNSS rescue map.

17. The method of claim 12, wherein the respective mobile device having demand for positioning data of at least the pre-defined accuracy level corresponds to use of an application or program on the respective mobile device that caused the respective mobile device to perform or attempt to perform operations that required positioning data of at least the pre-defined accuracy level.

18. The method of claim 12, wherein the particular quality level substantially corresponds to a pre-defined accuracy level provided by GNSS-based positioning.

19. An apparatus comprising:

one or more processors;

a non-transitory computer readable medium; and program instructions stored on the non-transitory computer readable medium and executable by the one or more processors to:

receive, from a plurality of mobile devices, information indicating a plurality of Global Navigation Satellite System (GNSS) rescue areas, wherein each respective GNSS rescue area of the plurality of GNSS rescue areas corresponds to a respective geographic area visited by a respective one of the plurality of mobile devices in which (i) at least one GNSS-based position estimate is or was unavailable and (ii) the respective mobile device had demand for positioning data of at least a pre-defined accuracy level;

generate a GNSS rescue map representing radio data for the plurality of GNSS rescue areas; and transmit, to a first mobile device, an offline radio map representing a subset of the GNSS rescue map, to provide radio data for at least one of the plurality of GNSS rescue areas or portion thereof in accordance with the subset.

20. The apparatus of claim 19, wherein the program instructions are further executable to: (i) receive, from the first mobile device, information indicating an approximate location of the first mobile device; and (ii) based at least on the approximate location of the first mobile device, determine the subset of the GNSS rescue map.

* * * * *